United States Patent
Grajcar

(10) Patent No.: US 10,244,595 B2
(45) Date of Patent: Mar. 26, 2019

(54) PHOTONIC ENGINE SYSTEM FOR ACTUATING THE PHOTOSYNTHETIC ELECTRON TRANSPORT CHAIN

(71) Applicant: Once Innovations, Inc., Plymouth, MN (US)

(72) Inventor: Zdenko Grajcar, Orono, MN (US)

(73) Assignee: Once Innovations, Inc., Plymouth, MN (US)

( * ) Notice: Subject to any disclaimer, the term of this patent is extended or adjusted under 35 U.S.C. 154(b) by 0 days.

(21) Appl. No.: 14/994,819

(22) Filed: Jan. 13, 2016

(65) Prior Publication Data

US 2016/0205739 A1    Jul. 14, 2016

Related U.S. Application Data

(63) Continuation-in-part of application No. 14/804,410, filed on Jul. 21, 2015.

(60) Provisional application No. 62/104,261, filed on Jan. 16, 2015, provisional application No. 62/027,049, filed on Jul. 21, 2014, provisional application No. 62/061,933, filed on Oct. 9, 2014, provisional application No. 62/102,637, filed on Jan. 13, 2015.

(51) Int. Cl.
    *A01G 7/04*      (2006.01)
    *A01G 9/02*      (2018.01)
    *H05B 33/08*     (2006.01)

(52) U.S. Cl.
    CPC ......... *H05B 33/0845* (2013.01); *A01G 7/045* (2013.01); *H05B 33/0827* (2013.01); *H05B 33/0872* (2013.01); *Y02P 60/149* (2015.11)

(58) Field of Classification Search
    CPC ............ H05B 33/0845; H05B 33/0827; H05B 33/0872; A01G 7/045
    See application file for complete search history.

(56) References Cited

U.S. PATENT DOCUMENTS

| 4,250,666 A | 2/1981 | Rakestraw |
| 4,441,145 A | 4/1984 | Antkowiak |
| 4,914,858 A | 4/1990 | Nijssen et al. |
| 5,012,609 A | 5/1991 | Ignatius et al. |

(Continued)

FOREIGN PATENT DOCUMENTS

| CN | 1400863 | 3/2003 |
| CN | 101605413 | 12/2009 |

(Continued)

OTHER PUBLICATIONS

"International Application Serial No. PCT/US2015/041236, International Search Report dated Oct. 23, 2015", 2 pgs.

(Continued)

*Primary Examiner* — Dedei K Hammond
*Assistant Examiner* — Raymond R Chai
(74) *Attorney, Agent, or Firm* — Schwegman Lundberg & Woessner, P.A.

(57) ABSTRACT

A horticultural system having lighting elements pulsed with an off time proportional to the turnover time of the photosynthetic electron transport chain of a plant. The lighting elements emit light at a wavelength within 20 nanometers (nm) of a peak absorption of the pigment of the plant and are controlled to provide light at predetermined intervals as needed by the plant cause photosynthesis and reduce excess unproductive light.

11 Claims, 12 Drawing Sheets

(56) References Cited

U.S. PATENT DOCUMENTS

| | | | |
|---|---|---|---|
| 7,220,018 B2 | 5/2007 | Crabb et al. | |
| 8,302,346 B2 | 11/2012 | Hunt et al. | |
| 8,373,363 B2 | 2/2013 | Grajcar | |
| 8,410,725 B2 | 4/2013 | Jacobs et al. | |
| 8,531,136 B2 | 9/2013 | Grajcar | |
| 8,545,915 B2 | 10/2013 | Schroeder | |
| 8,547,391 B2 | 10/2013 | Maxik et al. | |
| 8,552,942 B2 | 10/2013 | Hua et al. | |
| 8,568,009 B2 | 10/2013 | Chiang et al. | |
| 8,590,207 B1 | 11/2013 | Shih | |
| 8,596,804 B2 | 12/2013 | Grajcar | |
| 8,643,276 B2 | 2/2014 | Maxik | |
| 8,643,308 B2 | 2/2014 | Grajcar | |
| 8,651,691 B2 | 2/2014 | Grajcar | |
| 8,656,636 B2 | 2/2014 | Hunt et al. | |
| 8,729,832 B2 | 5/2014 | Maxik et al. | |
| 8,738,160 B2 | 5/2014 | Bucove et al. | |
| 8,754,832 B2 | 6/2014 | Maxik et al. | |
| 8,760,370 B2 | 6/2014 | Maxik et al. | |
| 8,847,514 B1 | 9/2014 | Reynoso et al. | |
| 8,850,742 B2 | 10/2014 | Dube | |
| 8,901,584 B2 | 12/2014 | Seo et al. | |
| 8,901,850 B2 | 12/2014 | Maxik et al. | |
| 2003/0004556 A1 | 1/2003 | Mcdaniel | |
| 2004/0065006 A1 | 4/2004 | Weder | |
| 2005/0125887 A1 | 6/2005 | Taylor | |
| 2005/0135104 A1 | 6/2005 | Crabb et al. | |
| 2006/0113927 A1 | 6/2006 | Bondy et al. | |
| 2007/0058368 A1 | 3/2007 | Partee et al. | |
| 2007/0151149 A1 | 7/2007 | Karpinski | |
| 2008/0302004 A1 | 12/2008 | Lin | |
| 2009/0303706 A1 | 12/2009 | Atehortua | |
| 2010/0020536 A1 | 1/2010 | Bafetti et al. | |
| 2010/0043287 A1 | 2/2010 | Jones et al. | |
| 2010/0244724 A1 | 9/2010 | Hendrick et al. | |
| 2011/0001766 A1 | 1/2011 | Hua et al. | |
| 2011/0101883 A1 | 5/2011 | Grajcar | |
| 2011/0109244 A1 | 5/2011 | Grajcar | |
| 2011/0179706 A1* | 7/2011 | Hunt | A01G 7/045 47/58.1 LS |
| 2011/0183368 A1 | 7/2011 | Chapman et al. | |
| 2011/0193487 A1 | 8/2011 | Janik | |
| 2011/0209404 A1 | 9/2011 | Scott | |
| 2011/0210678 A1 | 9/2011 | Grajcar | |
| 2011/0228515 A1 | 9/2011 | Grajcar | |
| 2011/0273098 A1 | 11/2011 | Grajcar | |
| 2012/0020071 A1 | 1/2012 | Mckenzie | |
| 2012/0075848 A1 | 3/2012 | Yamada et al. | |
| 2012/0099305 A1 | 4/2012 | Bucove | |
| 2012/0104977 A1 | 5/2012 | Mckenzie et al. | |
| 2012/0170264 A1 | 7/2012 | Mckenzie et al. | |
| 2012/0192486 A1 | 8/2012 | Shanahan et al. | |
| 2012/0268918 A1 | 10/2012 | Grajcar | |
| 2012/0287617 A1 | 11/2012 | Mekhtarian | |
| 2012/0326610 A1 | 12/2012 | Lawyer et al. | |
| 2013/0003382 A1 | 1/2013 | Ohura et al. | |
| 2013/0006401 A1 | 1/2013 | Shan | |
| 2013/0040380 A1* | 2/2013 | Hunt | A01G 7/045 435/292.1 |
| 2013/0139437 A1 | 6/2013 | Maxik et al. | |
| 2013/0172963 A1 | 7/2013 | Moffat | |
| 2013/0229114 A1 | 9/2013 | Eisele et al. | |
| 2013/0263503 A1 | 10/2013 | Bostdorff | |
| 2013/0264934 A1 | 10/2013 | Osaki et al. | |
| 2013/0278445 A1 | 10/2013 | Quell et al. | |
| 2013/0326941 A1 | 12/2013 | Pickett et al. | |
| 2014/0069007 A1* | 3/2014 | Chen | A01G 7/045 47/66.6 |
| 2014/0123555 A1 | 5/2014 | McCord et al. | |
| 2014/0152194 A1* | 6/2014 | Beyer | A01G 7/045 315/294 |
| 2014/0165462 A1 | 6/2014 | Shigyo et al. | |
| 2014/0250778 A1* | 9/2014 | Suntych | A01G 7/045 47/1.4 |
| 2015/0128488 A1 | 5/2015 | Casper et al. | |
| 2015/0128489 A1 | 5/2015 | Yamada et al. | |
| 2015/0150195 A1 | 6/2015 | Grajcar | |
| 2015/0216130 A1 | 8/2015 | Grajcar et al. | |
| 2015/0273235 A1 | 10/2015 | Grajcar | |
| 2016/0014974 A1 | 1/2016 | Grajcar et al. | |
| 2016/0100529 A1 | 4/2016 | Grajcar | |
| 2016/0109107 A1 | 4/2016 | Grajcar | |
| 2016/0113213 A1* | 4/2016 | Berinsky | A01G 7/045 47/58.1 LS |
| 2016/0192597 A1 | 7/2016 | Chang | |
| 2017/0071044 A1 | 3/2017 | Aikala | |

FOREIGN PATENT DOCUMENTS

| | | |
|---|---|---|
| CN | 101682953 A | 3/2010 |
| EP | 307991 A1 | 3/1989 |
| EP | 1626620 A1 | 2/2006 |
| EP | 2090154 A2 | 8/2009 |
| EP | 2181582 A1 | 5/2010 |
| EP | 2278870 A1 | 2/2011 |
| EP | 2556745 A1 | 2/2013 |
| EP | 2609362 A1 | 7/2013 |
| EP | 2785171 A1 | 10/2014 |
| GB | 2220551 | 1/1990 |
| JP | H08242694 A | 9/1996 |
| JP | 2001128571 | 5/2001 |
| JP | 2002199816 A | 7/2002 |
| JP | 20002199816 | 7/2002 |
| JP | 2003009662 A | 1/2003 |
| JP | 2004113160 A | 4/2004 |
| JP | 2005295955 | 10/2005 |
| JP | 2006262817 | 10/2006 |
| JP | 2008242694 | 10/2008 |
| JP | 4308891 B1 | 8/2009 |
| JP | 2009261267 A | 11/2009 |
| JP | 2011045286 A | 3/2011 |
| JP | 2011177127 A | 9/2011 |
| JP | 20111181484 A | 9/2011 |
| JP | 2013021981 A | 2/2013 |
| JP | 2014113145 A | 6/2014 |
| TW | 200621146 | 7/2006 |
| WO | 1997030579 | 8/1997 |
| WO | 2008118080 | 10/2008 |
| WO | WO-2011086358 A2 | 7/2011 |
| WO | WO-2013041389 A1 | 3/2013 |
| WO | WO-2014011623 A2 | 1/2014 |
| WO | WO-2014085626 A1 | 6/2014 |
| WO | WO-2014098735 A1 | 6/2014 |
| WO | 2015148897 | 10/2015 |
| WO | 2015161145 | 10/2015 |
| WO | WO2016014456 A1 | 1/2016 |
| WO | 2016061170 | 4/2016 |
| WO | WO-2016061170 A1 | 4/2016 |
| WO | WO2016115235 A1 | 7/2016 |

OTHER PUBLICATIONS

"International Application Serial No. PCT/US2015/041236, Written Opinion dated Oct. 23, 2015", 5 pgs.

"International Application Serial No. PCT/US2016/013224, International Search Report dated Mar. 10, 2016", 2 pgs.

"International Application Serial No. PCT/US2016/013224, Written Opinion dated Mar. 10, 2016", 4 pgs.

Roach, et al., "Regulation of Photosynthetic Electron Transport and Photoinhibition", Current Protein and Peptide Science, vol. 15, No. 4, (Apr. 28, 2014), 20 pgs.

U.S. Appl. No. 14/804,410, filed Jul. 21, 2015, Photonic Engine System for Actuating the Photosynthetic Electron Transport Chain.

"U.S. Appl. No. 14/804,410, Non Final Office Action dated Feb. 1, 2017", 17 pgs.

"International Application Serial No. PCT/US2015/041236, International Preliminary Report on Patentability dated Feb. 2, 2017", 7 pgs.

"International Application Serial No. PCT/US2016/013224, International Preliminary Report on Patentability dated Jan. 13, 2017", 8 pgs.

(56) References Cited

OTHER PUBLICATIONS

"U.S. Appl. No. 14/804,410, Final Office Action dated Aug. 23, 2017", 14 pgs.
"U.S. Appl. No. 14/804,410, Response filed Aug. 1, 2017 to Non Final Office Action dated Feb. 1, 2017", 9 pgs.
"U.S. Appl. No. 14/804,410, Response filed Dec. 22, 2017 to Final Office Action dated Aug. 23, 2017", 11 pgs.

* cited by examiner

PHOTONIC ENGINE SYSTEM FOR ACTUATING THE PHOTOSYNTHETIC ELECTRON TRANSPORT CHAIN

CLAIM OF PRIORITY

This application claims benefit of priority to and is based upon U.S. Provisional Patent Application Ser. No. 62/104,261, entitled "PETC Synchronized Lighting," filed Jan. 16, 2015, and is a Continuation-in-part of U.S. patent application Ser. No. 14/804,410, entitled "Photonic Engine System for Actuating the Photosynthetic Electron Transport Chain," filed Jul. 21, 2015, which claims benefit of priority to and is based upon U.S. Provisional Patent Application Ser. No. 62/027,049, entitled "Light Sources Adapted to Spectral Sensitivity of Plants," filed Jul. 21, 2014, U.S. Provisional Patent Application Ser. No. 62/061,933, entitled "Photonic Engine System for Actuating the Photosynthetic Electron Transport Chain," filed Oct. 9, 2014, and U.S. Provisional Patent Application Ser. No. 62/102,637, entitled "Photonic Engine System for Actuating the Photosynthetic Electron Transport Chain," filed Jan. 13, 2015, the benefit of priority of each of which is claimed hereby, and each of which are incorporated by reference herein in its entirety.

BACKGROUND

This invention relates to plant growth. More specifically this invention relates to a method and assembly of radiating plants to enhance photosynthesis.

It is well known in the art that during the photosynthesis process plants absorb different frequencies of light to cause photosynthesis to occur. In particular photosynthetically active radiation (PAR) is radiation in the spectral range from approximately 400 nanometers (nm) to 700 nm. Also known in the art is that chlorophyll, the most abundant plant pigment and the pigment responsible for plant metabolism is most efficient at capturing red and blue light.

During photosynthesis the chlorophyll pigments in a plant absorb photons in order to drive a metabolic process and dissipate other energy within the photons. Simultaneously other pigments that are red/farred and blue/UV-A and UV-B photosensors or photoreceptors chemically react to adjust the behavior and development of the plant. Thus, by providing red and blue spectrum light, plants have been shown to grow at increased rates.

In addition, also known in the art is that plants need turn over, or time in the dark. In particular, when a pigment has accepted a photon and is going through the metabolic process, the pigment cannot accept additional photons. Still, when additional photons bombard the plant the pigments will continue to attempt to metabolize thus straining or fatiguing the plant. Specifically photoinhibition is the phenomenon of the light induced reduction in the photosynthetic capacity of the plant—light-induced damage to PSII. Photosystem II is damaged by light irrespective of light intensity, with the quantum yield of the damaging reaction (in typical leaves of higher plants) in the range of $10^{-8}$ to $10^{-7}$. One PSII complex is damaged for every 10-100 million photons that are intercepted and therefore photoinhibition occurs at all light intensities and the rate constant of photoinhibition is directly proportional to the fluence or radiant exposure of the plant measured in Joules per meter^2. The efficiency of photo electron transfer decreases markedly only when the rate of damage exceeds the rate of its repair which requires PSII protein synthesis.

Secondary damage occurs when the photosynthetic apparatus absorbs photons that cannot be efficiently utilized in the process of oxygen production or CO2 fixation. The energy of excess photons is dissipated by non-assimilatory photochemistry, the extent of which is expected to increase linearly with light intensity beyond the capacity of the photosynthetic complex. Excess photons generate oxidative stress by producing reactive oxygen species (ROS). In low light levels, the level of ROS can be reduced to supportable levels by antioxidative systems that include ROS-scavenging enzymes (superoxide dismutase, ascorbate peroxidase) and multiple antioxidants ($\beta$-carotene, $\alpha$-tocopherol). However, the production of ROS is accelerated and high levels of ROS cause significant oxidative stress. ROS does not accelerate photo damage to PSII but instead inhibits repair of the PSII.

OVERVIEW

Therefore, a principle object of the present invention is to enhance growth characteristics in plants using a light source. Another object of the present invention is to provide cost effective lighting that enhances plant growth. Yet another object of the present invention is to provide a lighting assembly that is used for multiple plants. These and other objects, features and advantages will become apparent from the rest of the specification.

A horticultural system for growing a plant under artificial lighting that has artificial lighting elements that emit light at a wavelength that is within 20 nanometers (nm) of a peak absorption of a pigment of a plant. The lighting elements are placed in spaced relation to the plant so that the light emitted is absorbed by the plant for photosynthesis. In addition, the lighting elements are pulsed to provide predetermined intervals of light and dark that are not synchronous and instead presents dark intervals proportional to turnover time of the photosynthetic electron transport chain. Additional lighting elements are also used that similarly emit light at a wavelength within 20 nm of a peak absorption of a pigment of a plant and again pulsed proportional to the turnover time of the photosynthetic electron transport chain to effect the growth of the plant.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
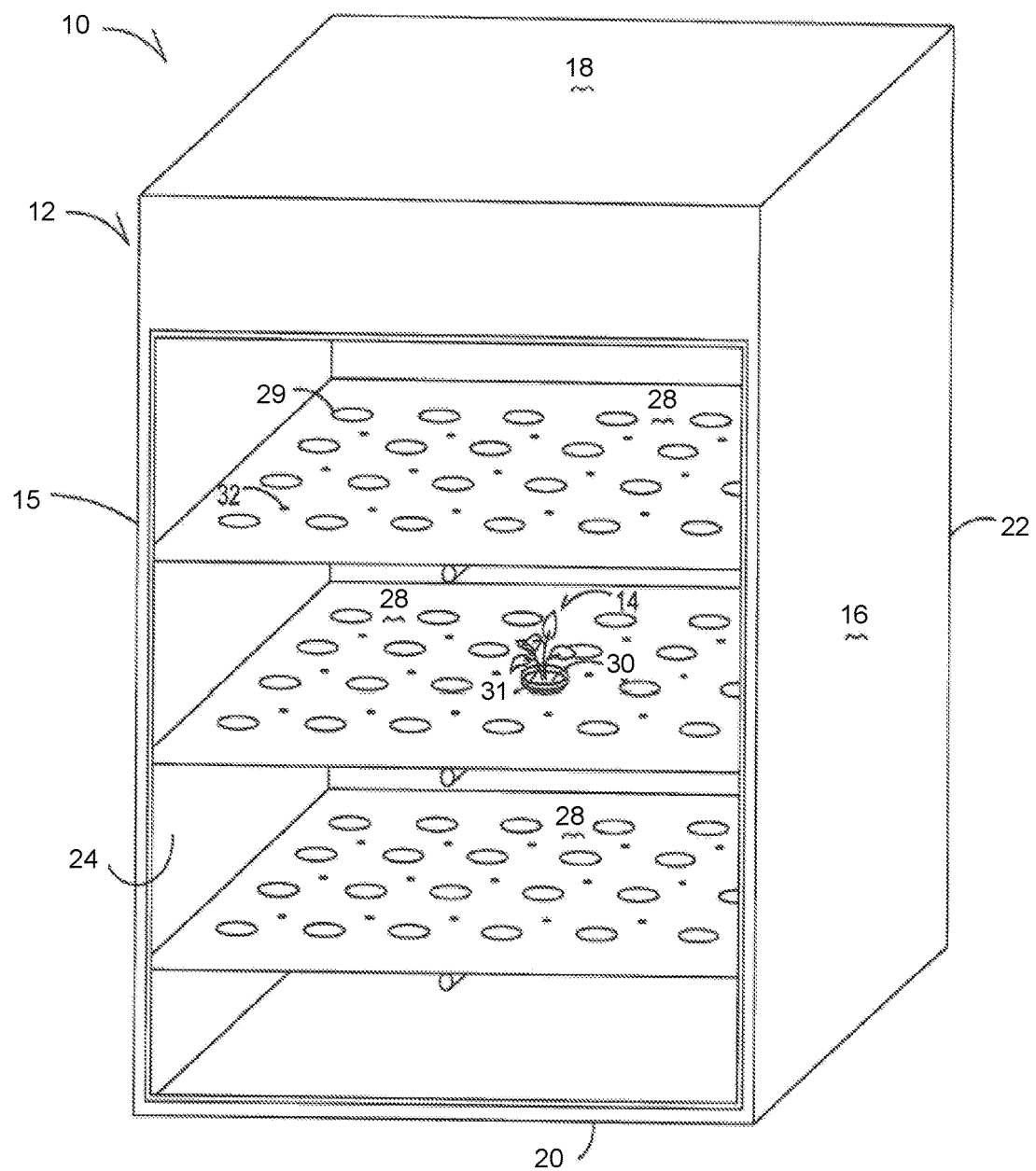
FIG. 1 is a side perspective view of a lighting assembly in a controlled environment for growing plant life.
Figure 2:
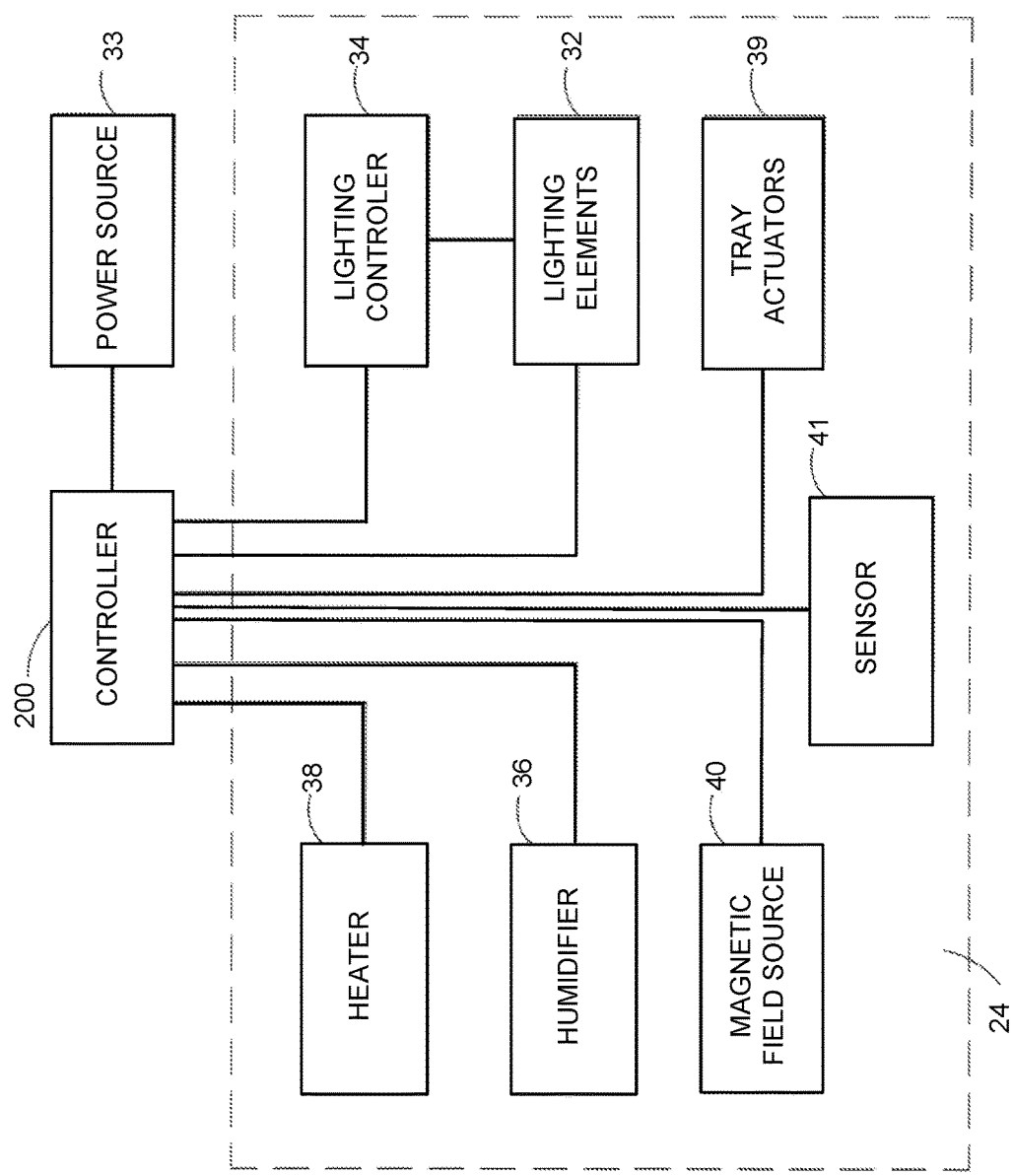
FIG. 2 is a block diagram of a lighting assembly for growing plant life.
Figure 3:
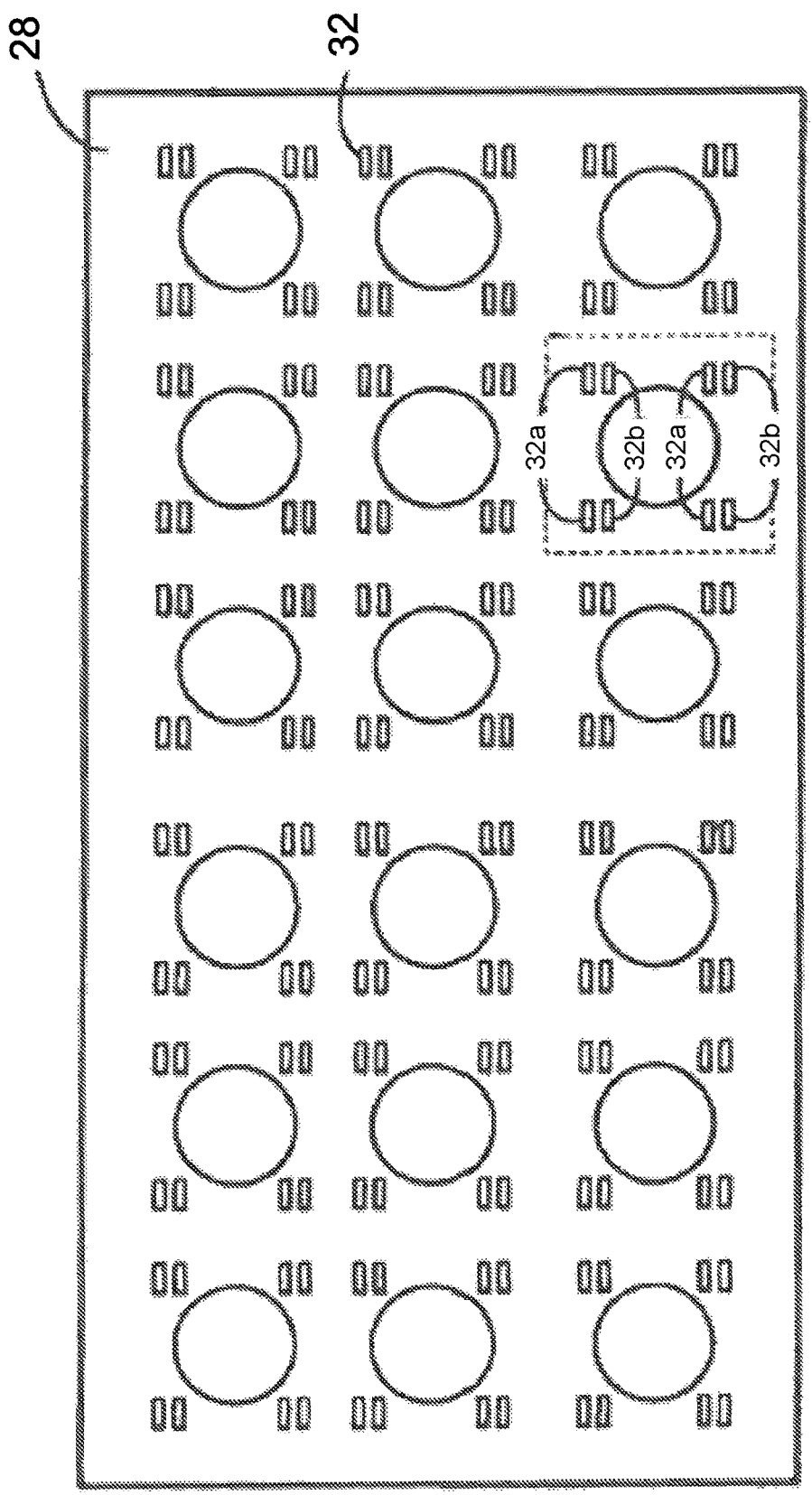
FIG. 3 is a top plan view of a tray of a lighting assembly for growing plant life.

The present invention focuses on the chemical reaction that occurs during photosynthesis and uses light as an engine to efficiently cause the photosynthetic reaction and minimize undesired photoinhibition resulting from auxiliary photo chemical reactions that ultimately temporarily inhibit and slow down the photo chemical reaction of the photosynthesis.

During photosynthesis, two complexes, photosystem I and primarily photosystem II provide a photosynthetic electron transport chain (PETC) to react with cytochrome of to bring about oxidation of water, reduction of nicotinamide adenine dinucleotide phosphate (NADP) and the production of Adenosine triphosphate (ATP), the chemical responsible for keeping cells electrically charged and also known as energy currency of life for both plants and animals.

Scientist have determined that photosystem ii (PSII) is the key complex that is reacted by light to cause this photochemical reaction. In particular the photosystem II complex comprises interlinked D1-polypeptide and D2-polypeptide having primary and secondary quinone $Q_A$ and $Q_B$. The D1-polypeptid binds the secondary quinone acceptor $Q_B$ while also having binding sites for primary electron donor and acceptor; P680 and pheophytin. P680 is formed of two chlorophyll α molecules that absorb light optimally at 680 nm. The D1-polypeptid also has a tyrosine residue that is a redox intermediate between a manganese complex $MN_4Ca$ and $P680^+/Pheo^-$ radical pair state. The D1-polypeptid also shares non-haem iron (Fe) along with the P680 and manganese complex with the D2-polypeptid. Also forming the photosystem II complex are cytochrome $b_{559}$, light harvesting chlorophylls CP43 and CP47, β-carotene and extrinsic proteins 16, 23 and 33.

When light bombards photosystem II the light reacts the photoactivated P680 and four electrons are removed from water molecules. Specifically, P680 transfers an electron to the pheophytin. At this time a positive charge is formed on the P680 to provide $P680^+$ that extracts electrons from water bound at the manganese. This is repeated until four electrons are transferred from two water molecules resulting in the byproduct of $O_2$. Meanwhile, the electron is transferred from the pheophytin to the primary quinone $Q_A$. The electron is then transferred to the secondary quinone $Q_B$ that uptakes two protons from a stroma to form plastoquinol, $PQH_2$. The plastoquinol formed then transfers its electrons through an electron transport chain via cytochrome βf to the photosystem I complex.

Photosystem I has two main components, psaA and psaB and similar to photosystem II, photosystem I contains two chlorophyll α molecules that absorb light, but instead of optimally at 680 nm, these chlorophyll α molecules absorb light optimally at 700 nm and thus is P700. PSI also contains a bound quinone $Q_A$, and a set of 4Fe-4S clusters.

When a photon bombards a plant the P700 electrons are transferred to the 4Fe-4S clusters such that an electron is transferred to ferredoxin (Fd) in the stroma resulting in the P700 having a positive charge $P700^+$. Ferredoxin is a water soluble mobile electron carrier that has a 2Fe-2S cluster coordinated to 4 cysteine residues. A plastocyanin then transfers an electron to the P700'. A flavorprotein containing a FAD then acts as a reductase to accept the electron from the ferredoxin to form $FADH_2$ that then transfers a hydride to $NADP^+$ to form NADPH and thus driving ATP synthesis as is known in the art. Thus, through an electron transfer chain electrons are transferred from water resulting in the synthesis of ATP.

This miracle of nature is the basis for a majority of plant life; however, inefficiencies remain. In particular, for example, within the PSII complex the $P680^+$ is very reactive and when produced in excess reacts with other chemicals such as available chlorophyll, ch1670 and β-carotene resulting in light induced damage. In particular, when the D1-polypeptide forms the $P680^+$ to undergo the needed electron transfer, proteolysis of the D1-polypeptide occurs requiting D1-protein synthesis to repair the D1-polypeptide and consequently the PSII so that the PSII can again be used for electron transfer. During this time period of proteolysis and ultimately D1-protein synthesis, excess $P680^+$ reacts with other chemicals such as the ch1670 and β-carotene to extract electrons therefrom resulting in the $P680^+$ to not function properly and cause damage to the plant or photoinhibition. In particular a plant synthetizes multifunctional carotenoids that act as antioxidants in the PSII system. In this manner the antioxidant function as an immune system preventing damage to the PSII and plant through the formation of antioxidants. This process takes an immense amount of energy that is wasted instead of being used for maximizing photosynthetic reactions. Thus, by minimizing the excess $P680^+$ production and chemical reactions with excess ch1670 chemicals by regulating the amount of protons delivered to the PSII, light induced damage is minimized and plant growth maximized. By eliminating energy use in this area, energy can be used almost exclusively for growth. If antioxidants are desired from nutritional value within certain plants, a more efficient method of growing the plant is to prevent the formation of these antioxidants during the entire growth cycle, then at the end of the growth cycle the plant can receive constant light causing the antioxidants to form at a time when growth is most ideally inhibited.

A first way to determine the amount of photons required by a plant is to look to the S-state transitions within the PSII. Flashes of light have been shown to cause the release of oxygen after the $3^{rd}$, $7^{th}$ and $11^{th}$ flashes, causing scientist to theorize that plants that are in the dark sit in an $S_1$ state and that each flash of light causes a photon to be accepted by the PSII causing a chemical reaction, with the $3^{rd}$ flash or photon resulting in the byproduct of $O_2$, indicating that the four electrons have been transferred from two water molecules and the electron transfer is complete. Similarly, thereafter the PSII is put in a $S_0$ state in which the $4^{th}$ flash provides a single photon, the $5^{th}$ another until all 4 flashes resulting in the 4 electrons being donated occurs, thus resulting in the byproduct of $O_2$ after the $7^{th}$ and then $11^{th}$ flashes. This is known as the Kok cycle.

On a fundamental level, during the first flash there is a transition from a first state $S_1$ to a second state $S_2$ that involves an electron transfer from the manganese complex $MN_4Ca$ to the tyrosine residue to form a tyrosine radical. At that point when a second flash or additional photon is introduced the transition from the $S_2$ to $S_1$ state occurs, causing the release of a proton from the MN complex after the formation of the tyrosine radical and before oxidation of the MN complex. With a third flash or introduction of another photon a transition from the $S_3$ state and onto an $S_4$ and subsequently from $S_4$ to $S_0$ occurs resulting in dioxygen release. Specifically, after the proton release of the MN complex, the photon causes an electron transfer from the MN complex again to the tyrosine residue followed by a rapid onset of water oxidation and MN reduction and another proton is released by the MN complex. Finally a fourth flash results in the transition from the $S_0$ state back to the $S_1$ state as a result of the oxidation of the MN complex and deprotonation of the MN complex.

While the S-State transitions and functioning is still theoretical in nature, the importance of the transitions is the realization that once a photon bombards the PSII complex, an initial chemical reaction occurs and that the chemical reaction takes a predetermined amount of time to get to a new transition state and before an additional photon is required. Specifically the amount of time it takes the PSII complex to transition between the $S_1$ and $S_2$ stages is approximately 70 µs; between $S_2$ and $S_3$ stages is approximately 190 µs, between $S_3$ and $S_4$ stages is approximately 200 µs, between $S_4$ and $S_0$ stages is approximately 1.1-1.6 ms, and between $S_0$ and $S_1$ stages is approximately 30-60 µs. Similarly, during the photosynthetic process, the photochemical decay of antenna in the PSI complex are 15-40 ps and 5-6 ns. In other words, during the photosynthetic process, different chemical reactions require photons at different intervals of time and each chemical reaction that occurs has a predetermined time period associated therewith where excess photons are unneeded. Instead, excess photons merely provide additional potential energy to reactive centers in the PSI and PSII complexes such as P680 that provides a mechanism for P680 to react with other chemicals within the PSII and harm the plant as described above.

While the photosynthetic electron transfer within the PSII is considered linear, once the reaction transports electrons through the β-carotene to the PSI cyclic electron transport operates around the PSI. Specifically proton and electron transport results in the formation of transthylakoid proton potential (pmf) to drive the formation of ATP. In high plants these pathways consists of ferredoxin quinone oxidoreductase (FQR)- and NAD(P)H dehydrogenase (NDH)-dependent pathways. As a result of these cyclic pathways electron flow around the PSI protects the PSII by enhancing protonation of the lumen to limit electron transport and thus limiting formation of ROS. Thus, enhancing or providing proper lighting for the PSI to enhance this function also functions to reduce damage causing ROS. Thus, by providing proper doses of light at a wavelength between 700 nm and 720 nm, for the reactive P700 center of the PSI at a predetermined intensity and for a predetermined period of time maximizes the cyclic flow functioning of the PSI again limiting unneeded chemical reactions that damage the PSII and reduce efficiency of the photosynthesis of the plant.

Thus, an algorithm is developed to determine the correct amount of time needed between photons being released for absorption by a plant. In addition, the algorithm takes into account the individual pigments and cytochromes of the plant and the energy levels required to cause a chemical reaction of the pigments and cytochromes at the required time. For example, within pigments the amount of energy required to cause an electron jump from an S0 state to the S1 state is approximately 1.84 electron volts (eV) or the amount of energy provided by light at a wavelength of 676 nm. Thus at approximately 680 nm absorption of energy is shown at a peak level. As wavelengths of light decrease from 680 nm energy levels increase. Thus when light is provided, for example only, at 550 nm, enough energy is provided to cause the transition from the S0 state to the S1 state; however, excess energy remains that either results in the plant fluorescing or remitting at a different wavelength or excess heat is produced.

At approximately 445 nm approximately 2.8 eV of energy is produced, that is enough energy to cause an electron to jump from the S0 state to the S2 state. The electron then quenches immediately to the S1 state where electron transfer occurs. This quenching results in some wasted heat compared to the 676 nm, 1.84 eV energy level that causes the jump straight to the S1 state; however, does present a second peak of absorption that minimizes loss of energy as a result of excess energy as compared to the energy provided at other wavelength; for example only, 550 nm. In this manner in designing a light, if producing 676 nm light is significantly more expensive than producing 445 nm light, the 445 nm light can be used to minimize effects of energy lost even though 676 nm light is preferred.

In addition, cytochromes within a plant also effect the electron transfer chain resulting in photosynthesis. For example; cytochrome βf has a main pigment of carotene that absorbs green light (wavelengths 495 nm 570 nm) This absorption creates a higher gradient thus pulling an electron down faster speeding oxidation and thus speeding photosynthesis. In this manner green light regulates photosynthesis providing a signal. In this manner, after the electron transfer chain begins from red or blue light, green light can be provided to increase the speed of the process.

Figure 5:
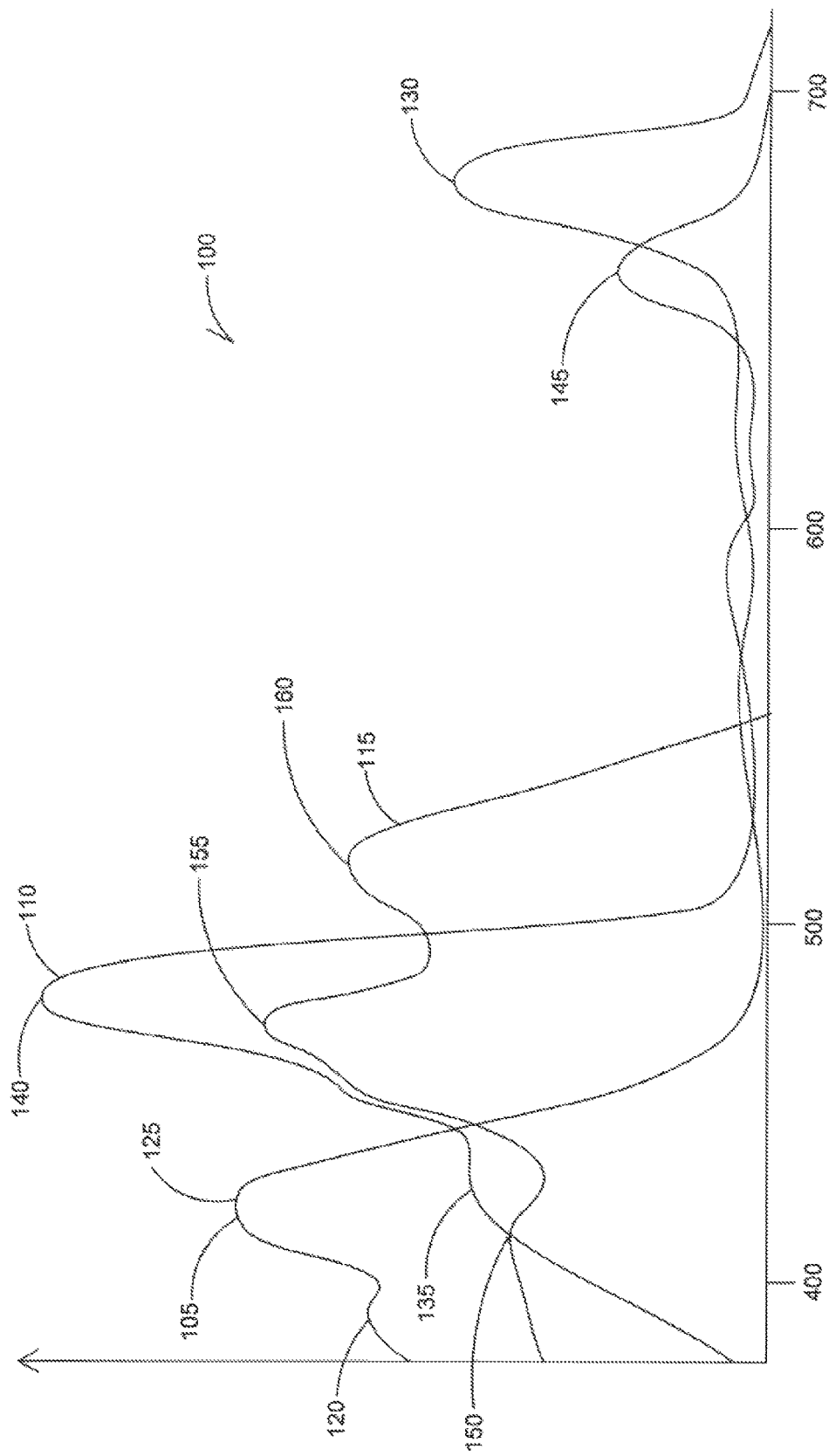
FIG. 5 is a graph showing amount of light absorbed by chlorophyll A; chlorophyll B and Carotenoids over a range of wavelengths.

In general, most plants contain either Chlorophyll A, Chlorophyll B or Carotenoids, or some combination of the three. Specifically, Chlorophyll A, Chlorophyll B and Carotenoids are pigments responsible for photosynthesis within plants. FIG. 5 shows an exemplary plot 100 of light absorbed by Chlorophyll A, Chlorophyll B and Carotenoids, as a function of wavelength as shown in curves 105 (Chlorophyll A), 110 (Chlorophyll B) and 115 (Carotenoids).

In the depicted figure, the curve 105 provides an exemplary representation of chlorophyll A receptiveness, or absorption of different wavelengths of light. Absorption appears with peaks evident in wavelengths between 380 and 780 nm. In this example, a first peak 120 of chlorophyll A occurs at about 400-410 nm, a second peak 125 occurs at about 430-450 nm and a third peak 130 occurs at about 670-685 nm. These examples are illustrative and not limiting.

For the chlorophyll B absorption curve 110 a first peak 135 occurs at about 430-450 nm. The second peak 140 occurs at about 470-490 nm with a final peak 145 occurring at about 665-670 nm. Again, these examples are illustrative and not limiting.

For the carotenoids absorption curve 115 a first peak 150 occurs at about 415-420 nm. The second peak 155 occurs at about 465-470 and a third peak 160 occurs at about 510-525 nm.

Again, these examples are illustrative and not limiting.

In addition to chlorophyll A, chlorophyll B and carotenoids, the other chemicals of photosynthesis, such as the proteins, β-carotenes and the like essential to the photosynthesis, destruction and reconstruction of PSII have light reactive chemical reactions and specific absorption wavelengths of light to cause these chemical reactions.

In addition plants naturally have transient properties associated therewith. In particular, when light first reaches the plant, the light is nearly automatically absorbed, but as the light continues to provide additional energy, the light is not absorbed as quickly as a result of natural transient properties of the plant. When light is pulsed downtime exists between each pulse, causing a virtual reset for the plant, thus causing each pulse of light to be efficiently absorbed because of the minimization of transient effects the plant has in regard to the light. In this manner, less light and intensity is required to cause desired photochemical reactions. Thus, to maximize efficiencies within the plant not only is light provided at predetermined intervals, during the predetermined intervals of light, the light is evenly pulsed to minimize transient properties of the plant and increase photosynthetic efficiencies.

Thus artificial light can be designed and used to not only replace the light received by the sun, but as a tool to manipulate photosynthesis and growth of a plant as desired by the designer.

For example only, shown in FIG. 1 is a horticultural assembly 10 can be at any location, including outdoors, in a green house, indoors or the like. The assembly 10 includes a container or space 12 where plants 14 that are typically planted in side by side relation are located. In one embodiment a container 12 is provided that is an incubating device that in one embodiment is generally rectangular in shape having first and second sidewalls 15 and 16 in paralleled spaced relation secured to top and bottom walls 18 and 20 also in paralleled spaced relation and a back wall 22 to form and hollow interior cavity 24. A front wall or door 26 is hingedly secured to a sidewall 14 or 16 to allow access to the interior cavity 24 of the body 12. Preferably the door is made of a transparent material to allow the interior cavity 24 to be seen, though in another embodiment the door 26 completely encloses the interior cavity 24.

Disposed within the interior cavity 24 are a plurality of rotatable holding members or trays 28 having openings 29 that receive a plurality of soil masses 30 having seedlings 31 therein. In particular the soil masses 30 are of size and shape to be received and held by the openings 29 of the trays 28. The trays 28 rotate or tilt to various angles to ensure complete coverage of the lights on the soil masses 30 and seedlings 31.

A plurality of lighting elements 32 are secured to each tray 28 and electrically connected to one another. In a preferred embodiment the plurality of lighting elements 32 are light emitting diode elements that receive an AC input. In particular these assemblies incorporate AC driven LED technology from any one of the following patent applications: U.S. Pat. Pub. No. 2011/0101883 to Grajcar; U.S. Pat. Pub. No. 2011/0109244 to Grajcar; U.S. Pat. Pub. No. 2011/0210678 to Grajcar; U.S. Pat. Pub. No. 2011/0228515 to Grajcar; U.S. Pat. Pub. No. 2011/0241559 to Grajcar; U.S. Pat. Pub. No. 2011/0273098 to Grajcar; U.S. patent application Ser. No. 13/452,332 to Grajcar; and/or U.S. Pat. Prov. Appl. No. 61/570,552 to Grajcar, all of which are incorporated in their entirety herein.

Figure 8:
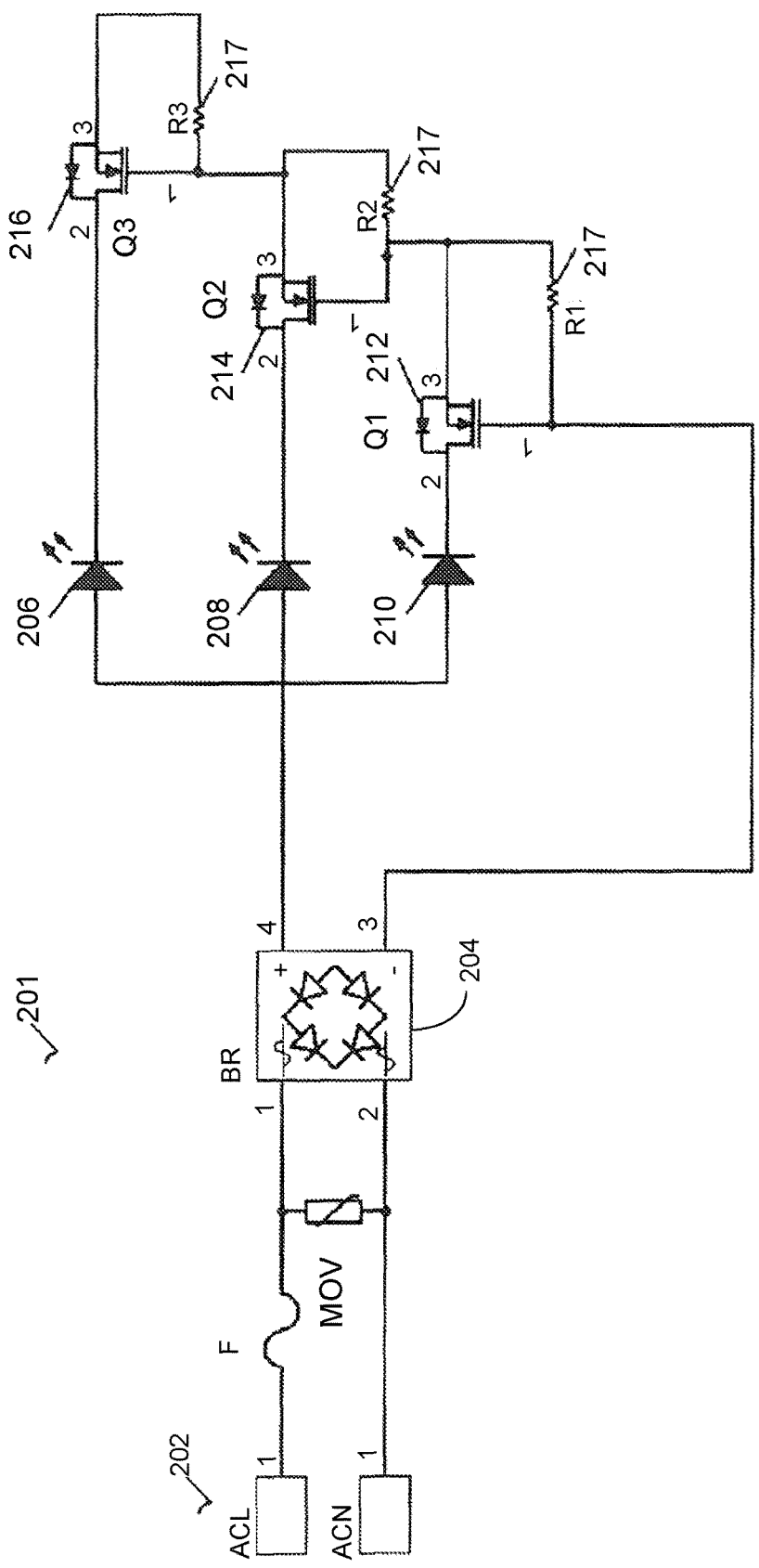
FIG. 8 is a schematic diagram of a circuit of a lighting device for a horticultural system.

In one embodiment, each lighting element 32 causes the emission of blue wavelength (450-495 nm) light, ultraviolet light and near ultraviolet light (350-450 nm), red light (620-750 nm) or electromagnetic radiation is utilized. Specifically, lighting elements 32 have electromagnetic radiation/ultraviolet/blue wavelength lighting elements and red wavelength elements combined on the same tray 28 as shown in FIG. 8 as lighting elements 32a and 32b. Such blue and red wavelength lighting elements 32a and 32b in one embodiment have light duration periods that are different. So, as an example, a first blue wavelength lighting element has a light duration period of 3 ms while a red wavelength lighting element has a light duration of 2 seconds.

Alternatively the lighting elements 32a and 32b have the same duration only staggered. As an example of this embodiment, a first blue wavelength lighting element 32a has a duration or period of 3 ms of light and 3 ms of dark. A second red wavelength lighting element 32b is also provided on the tray that also has a duration or period of 3 ms of light and 3 ms of dark. In one embodiment the first and second lighting elements emit light at the same time or present an overlap. In another embodiment, the second red wavelength lighting element is dark during the 3 ms the first blue wavelength lighting element is producing light. Then when the second red wavelength lighting element is producing light for 3 ms the first blue lighting element in dark and not emitting light.

The lighting elements 32 are powered by an electrical power source 33 and further have a dimming device 34 that causes the intensity of the light to be reduced to less than 3 lumens. Thus a constant low intensity wavelength light is emitted throughout the container 12. The light can be of a narrow frequency or monochromatic to direct the exact wavelength of light desired. In addition, while described as low intensity, a higher intensity wavelength of light can be provided. Further, in the embodiment where LED elements are utilized because of the properties of LED lighting elements, the lights can be left on for long durations of time.

While the intensity of the light can be reduced to less than 3 lumens, the intensity of the light similarly can be increased to output 800 lumens, 1000 lumens or more. Similarly, while light duration can be for long periods of time such as days, weeks or months, the duration between light and dark periods can also be controlled to hours, minutes, seconds and even ml seconds.

A humidifying device 36 is also associated with the interior cavity 24 and preferable engages the top wall 18 and has a tubing element that can increase the humidity within the interior cavity 24 when the door 26 is closed. In this manner the humidity within the interior can be controlled to provide any relative humidity from 0% humidity to 100%, such that the humidity with the interior cavity 24 is predetermined. Preferably the humidity is approximately between 50-80%. A heating device 38 is also electrically connected to the power source 33 and disposed within the interior cavity 24 to provide a predetermined amount of heat within the interior cavity.

In one embodiment a magnetic device 40 is associated with the incubating device 10. In one embodiment the magnetic device 40 is within the interior cavity to form a predetermined magnetic flux through or affecting the seedlings and resulting plants 14.

In addition, another consideration is the intensity of each lighting element. In particular as intensity or lumens/m2 or lux on the plant 14 or seedling 31 increases the amount of energy being supplied to the plant 14 or seedling 31 is increased, thus lessening the amount of time needed to provide the proper dose, or energy needed to create the photochemical reaction, or photosynthesis.

In addition, during the duration of a day, or during the period in which light is provided to cause a photochemical reaction, the dose of energy required to cause the chemical reaction increases. Specifically, the dose needed to cause photosynthesis is dynamic. Therefore the amount of time needed to provide sufficient energy to cause the photochemical reaction or photosynthesis can actually increase during a day or over time, such that in the beginning of a period of lighting, the optimum dose is provided with a first predetermined amount of time, such as 3.5 ms and after a period of time such as 12 hours, a second predetermined amount of time, such as 14.5 ms of light is required.

Thus, by using a controller 200 that controls photoperiod, an algorithm for each plant 14 or seedling 31 can be provided that is specifically tailored or dynamically changes the frequency or photoperiod of the lighting elements 32 throughout a predetermined time period, such as twelve (12) hours, twenty-four (24) hours, forty-eight (48) hours or greater. By dynamically increasing the photoperiod to correspond with the dynamically changing requirements for the chemical reaction or photosynthesis to occur, the photosynthesis efficiency is enhanced and growing of the plant 14 or seedling 31 optimized.

Similarly, the intensity of the light can be dynamically changed by the controller 200, either by increasing and decreasing voltage and thus light output intensity or by having the controller 200 electrically connected to tray actuators 39 that mechanically raises and lowers the trays 28 to bring the lighting elements 32 closer or further away from the plants 14 or seedlings 31. In addition, a sensor 41 can be electrically connected to the controller 200 to determine the height of a plant 14 and automatically, and dynamically move the tray 28 away from the plant 14 to ensure the correct intensity is always provided to the plant.

While described as being planted in side by side relation, a single plant 14, or plurality of plants 14 planted in any relation to one another is contemplated and does not fall outside of this disclosure. The lighting elements 32 in one embodiment are placed or mounted adjacent the plants 14 such that at least one plant receives radiation emitted by the lighting elements 32.

Figure 4:
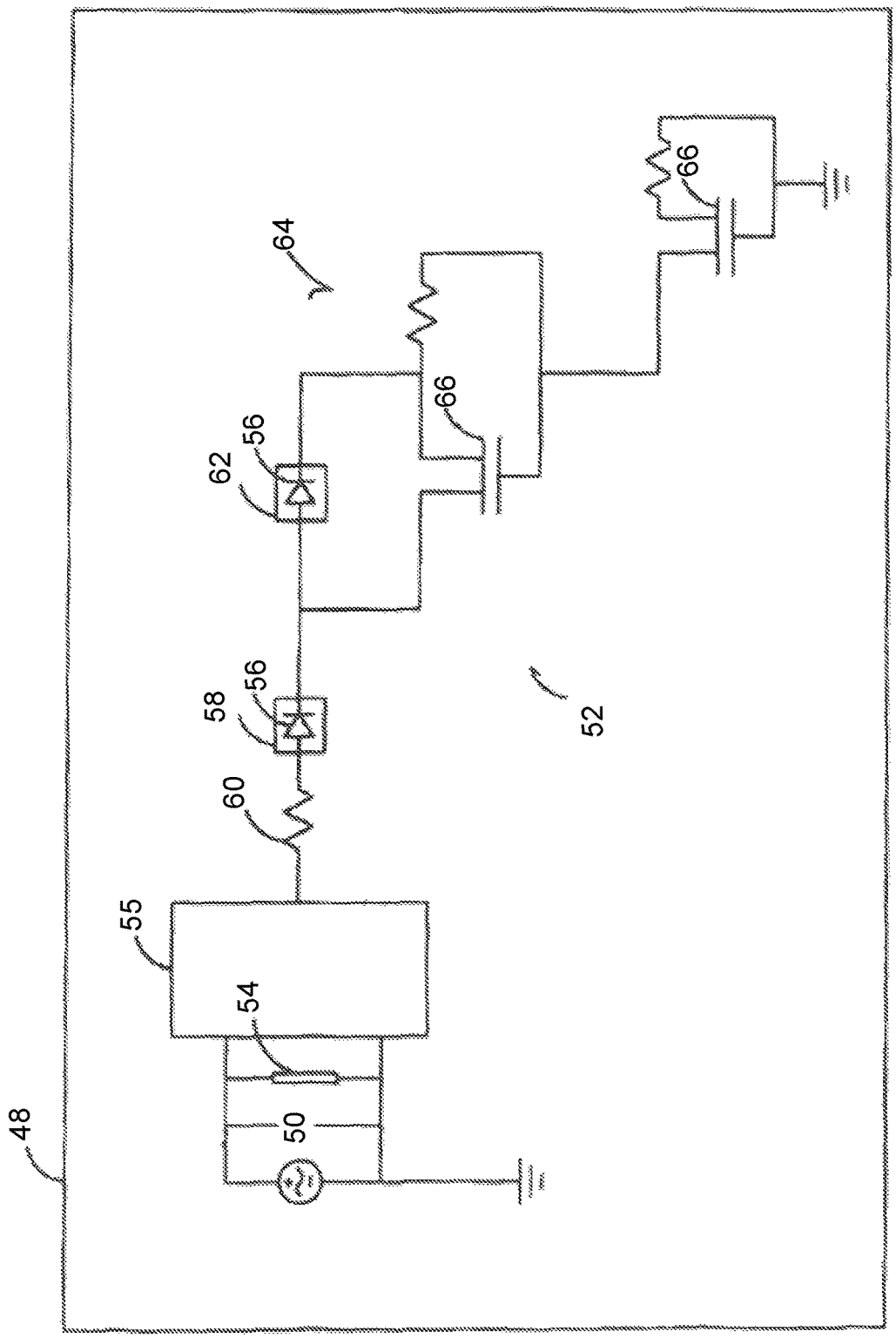
FIG. 4 is a schematic diagram of a circuit for a lighting assembly for growing plant life.

The lighting elements 32 are dimmable and are constructed as is described in U.S. patent application Ser. No. 12/824,215 to Grajcar and/or U.S. patent application Ser. No. 12/914,575 to Grajcar, both that are incorporated herein. One such assembly as an example only is shown in FIG. 4 having a pair of input terminals 50 that are adapted to receive a periodic excitation voltage such that the terminals can receive AC current or a current of equal magnitude and opposite polarity, said current flowing in response to the excitation voltage to provide an AC input. The AC current is then conditioned by driving circuitry 52 that optionally includes an metal oxide varesistor (MOV) 54 and a rectifying device 55 that in a preferred embodiment is a bridge rectifier formed of a plurality of light emitting diodes (LEDs) 56.

The light emitting diodes (LEDs) 56 are arranged in a first network 58 where the first network 58 is arranged to conduct the current in response to the excitation voltage exceeding at least a forward threshold voltage associated with the first network 58. Optionally depending on the driving circuitry 52 a resistor 60 or multiple resistors can be used to condition the current before reaching the first network 58. The LEDs 56 of the first network 58 can be of any type or color. In one embodiment the LEDs 56 of the first network 58 are red LEDs that produce light having a wavelength of approximately 600-750 nanometers (nm). In another embodiment the first network of LEDs are blue LEDs that produce light having a wavelength of approximately 350-500 nm. Alternatively both red and blue LEDs can be provided together or other colored LEDs such as green may similarly be used without falling outside the scope of this disclosure.

A second network 62 having a plurality of LEDs 56 is additionally provided in series relationship with the first network 58. The LEDs 56 of the second network 62 can be of any type or color. In one embodiment the LEDs 56 of the second network 62 are red LEDs that produce light having a wavelength of approximately 600-750 nanometers (nm). In another embodiment the second network of LEDs are blue LEDs that produce light having a wavelength of approximately 350-500 nm. Alternatively both red and blue LEDs can be provided together or other colored LEDs such as green may similarly be used without falling outside the scope of this disclosure.

A bypass path 64 is provided in the lighting element 32 that is in series relationship with the first network 58 and in parallel relationship with the second network 62. Also within the bypass path 64 are elements that provide a controlled impedance, which can be, for example only a transistor 66 that in one embodiment is a depletion MOSFET. Additional transistors, resistors or the like can be used within the bypass path 64 all that condition current to provide the smooth and continuous transition from the bypass path 64 to the second network 62.

Accordingly, it is appreciated from the disclosure herein that color temperature shifting as a function of input excitation waveforms may be implemented or designed based on appropriate selection of LED groups or networks 58 and 62 and arrangement of one or more selective current diversion conditioning circuits to modulate a bypass current around selected LED networks 58 and 62. The selection of the number of diodes in each group, excitation voltage, phase control range, diode colors, and peak intensity parameters may be manipulated to yield improved electrical and/or light output performance for a range of lighting applications.

The lighting elements 32 are able to be modulated using the dimming device 34 without utilization of a DC power source. In one embodiment as shown the dimming device 34 utilizes leading edge and falling edge phase cutting elements. As an example only a triac dimmer presents phase cutting at a leading edge while an IGBT dimmer presents phase cutting at a trailing edge. In this embodiment the dimming device having both leading edge and trailing edge phase cutting is in electrical communication with the driving circuitry 52. In this manner by utilizing both in a dimming device 34 a predetermined period of no current is provided. Thus a control device associated with the dimming device 34 can be used to determine the period of no current and thus period of dark.

In another embodiment the dimming device 34 includes at least one SCR silicon controlled rectifier) and in one embodiment first and second SCRs that are utilized to cut current provided for a predetermined period of time. The cut can occur at a 0 phase angle or alternatively at an angle. Thus, by utilizing SCRs, the dimming device 34 again functions as a controllable on/off switch of the lighting elements 32. Specifically, in one embodiment the control device, such as a control knob is in communication with first and second SCRs such that the predetermined period of light and dark can be set at any predetermined time period from 0-30 minutes. Because an AC input is provided, the dark provided is a complete darkness where no photons are being produced as a result of no current being provided, unlike DC based flicker. In this manner one can control the predetermined durations of light and dark to match the requirements of specific plants.

Figure 6:
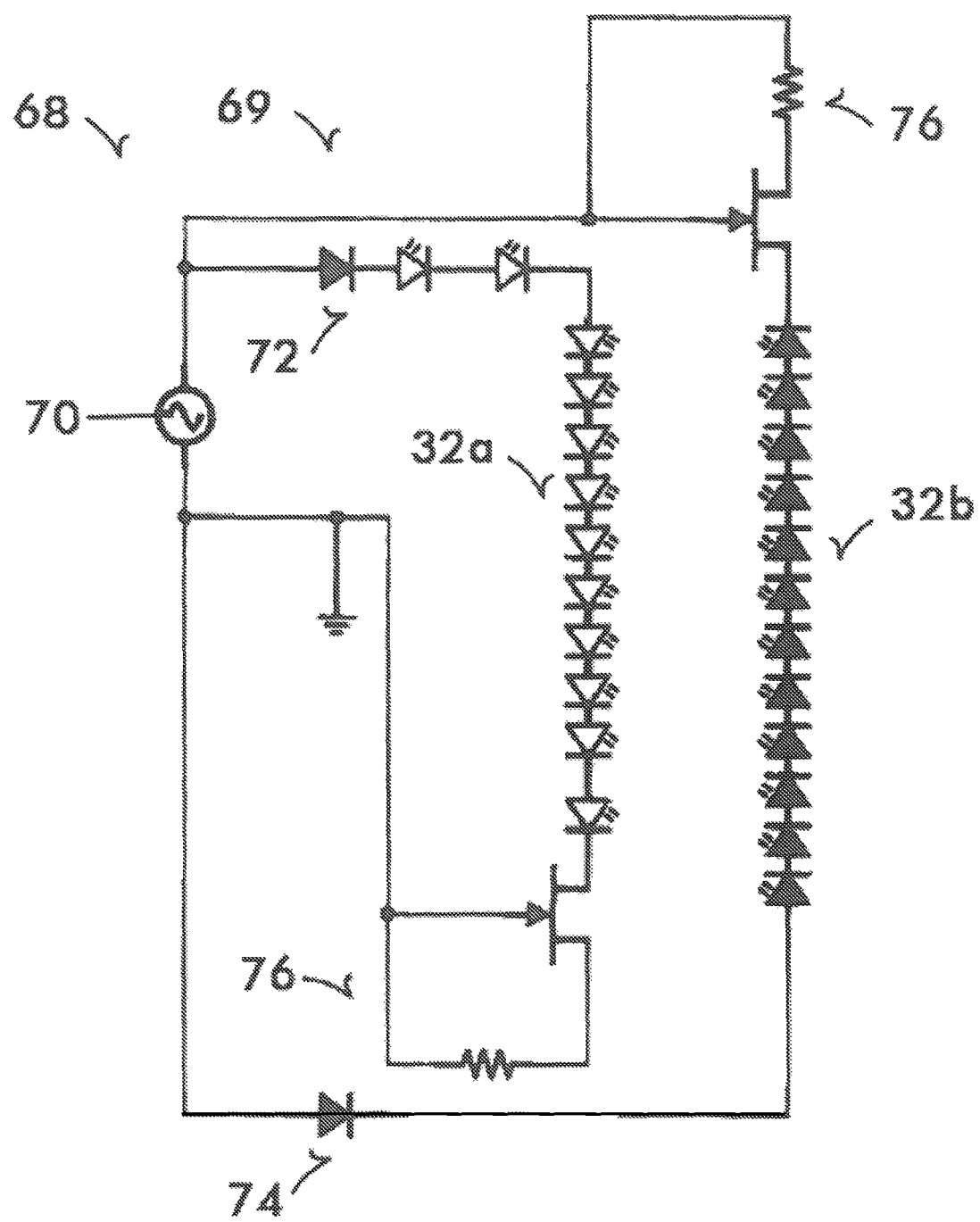
FIG. 6 is a schematic diagram of a circuit for a lighting assembly for growing plant life.

FIG. 6 shows an alternative embodiment that allows for the staggering of different lighting elements 32a and 32b. This embodiment shows a circuit 68 having an AC input 70 that provides AC current to driving circuitry 69 that includes a half of a bridge rectifier 72 to supply an input in a first plurality of lighting elements 32a that in one embodiment provide a red spectral output. Then in parallel the second plurality of lighting elements 32b receive an input from the AC input through a diode 74, such as a zener diode. Each group of lighting elements 32a and 32b also have additional current conditioning elements that in this embodiment are provided as a transistors with controlling resistors.

Figure 7:
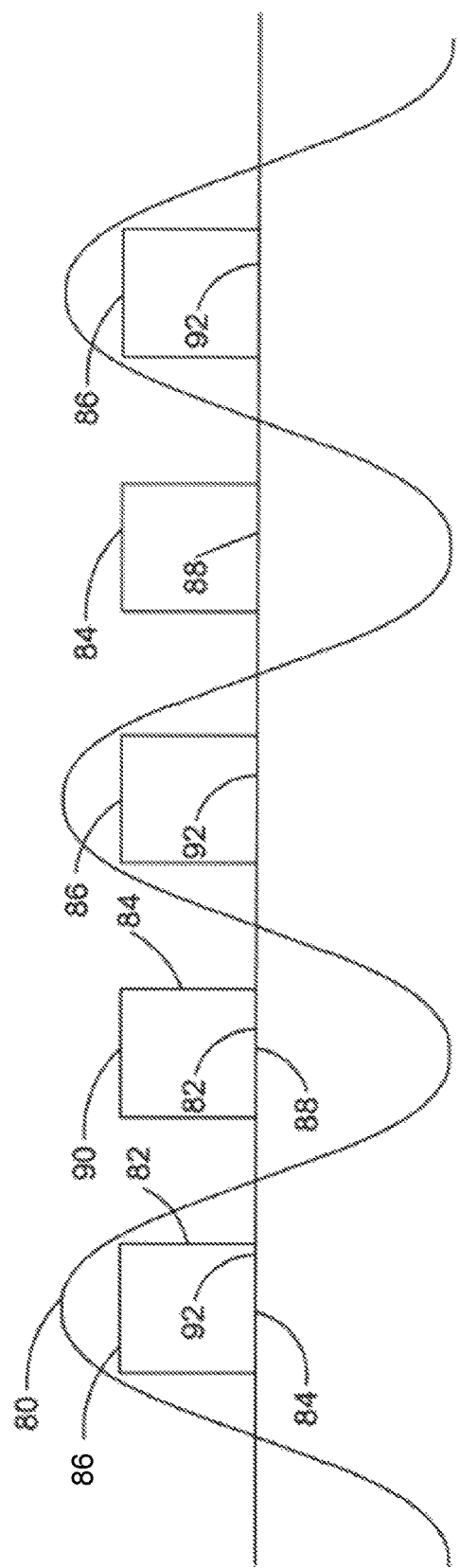
FIG. 7 is a graph showing the waveforms for the voltage and input currents for the circuit of FIG. 6.

Therefore, current inputted to the first and second lighting elements 32a and 32b is conditioned as shown in FIG. 7. FIG. 7 shows the voltage input 80 and current inputs 82 and 84 to lighting elements 32a and 32b resulting from circuit 68. The first current input 82 provides a maximum current input 86 when positive voltage is applied to the circuit and no current 88 when voltage input 80 drops below 0. Meanwhile, the second current input 84 provides a maximum current input 90 when voltage is negative, or below zero, while no current 92 is presented when the voltage is above zero or positive.

Consequently, with a single voltage source, the current frequency to each set of lighting elements 32a and 32b is offset such that during a period when no current is flowing to the first lighting elements 32a, causing darkness in first lighting elements 32a, current is flowing to second lighting elements 32b causing light to be provided by the second lighting elements 32b and vice versa. In this manner a human perceives continuous light, but the plant receives a period of wavelength of light it absorbs and then a period of light it does not absorb, and thus the individual pigments perceive light and dark periods.

Similarly the lighting elements 32a and 32b are controlled to provide varying periods of light to a plant. So, a single lighting element 32a is driven to provide light at a first time, then not emit light able to be absorbed by the plant for a predetermined amount of time based on a predetermined period of time required for a predetermined chemical reaction within the plant to occur and then light is again emitted by the lighting element 32 and then no longer emits light able to be absorbed the plant for a second predetermined period of time to allow a second chemical reaction to occur, wherein the first and second predetermined periods of time can be equal or different and each causes a predetermined biological effect within the plant. Thus differing periods between emitting absorbable light is provided wherein such differing periods include, but are not limited to 30 μs, 70 μs, 190 μs, 200 μs or 1.1 ms, or 15-40 ps or 5-6 ns without falling outside the scope of this disclosure. In this manner an algorithm can be developed based on individual plant needs in order to time the period of absorbing light vs an output, including dark, that is not absorbed by to cause a chemical reaction.

Figure 9:
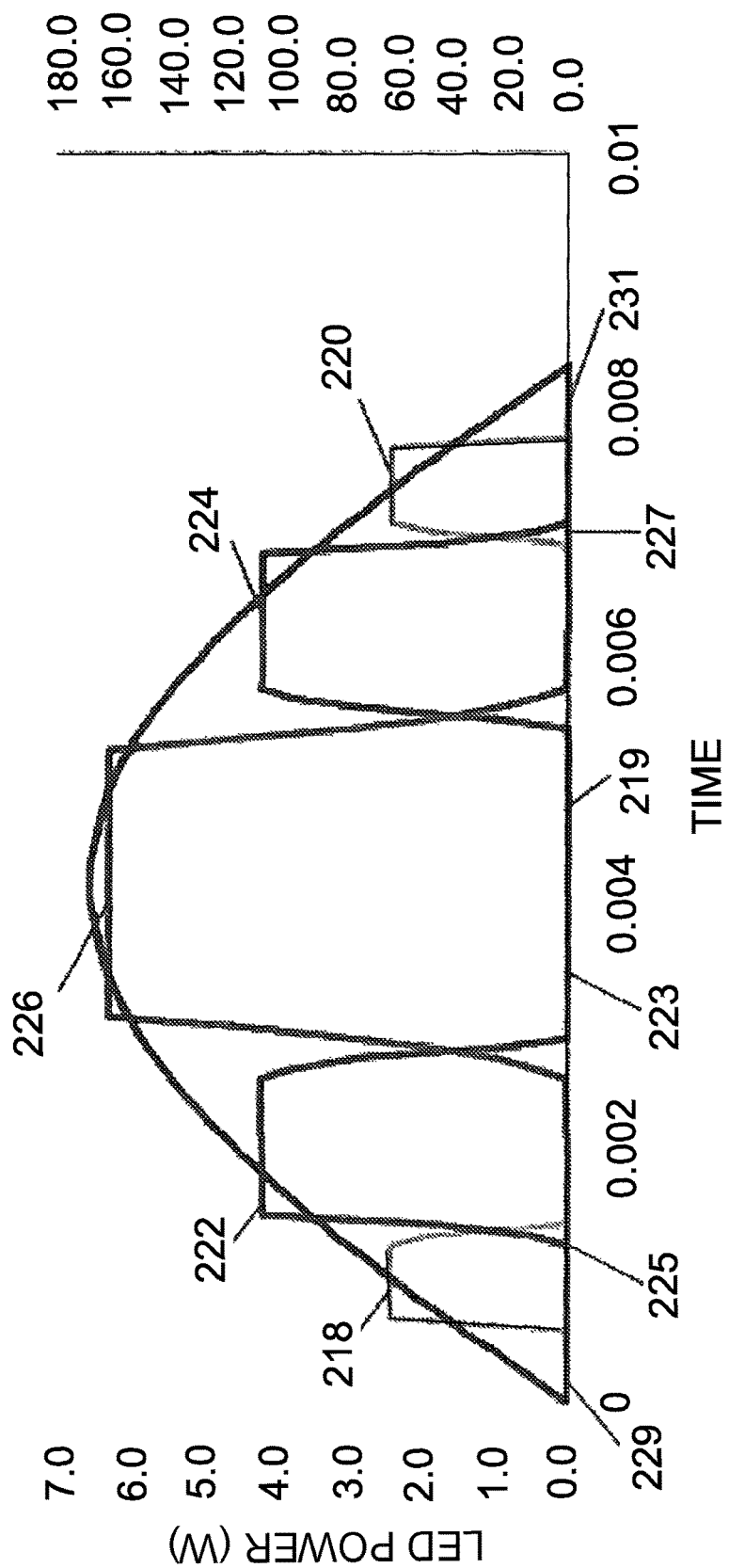
FIG. 9 is a graph showing the input voltage as a function of time for different lighting elements of FIG. 8.

In another exemplary embodiment FIG. 8 and FIG. 9 show an alternative circuit 201 and graph of the wave output thereof. The circuit 201 has an input 202 providing electrical excitation of opposing magnitudes that is rectified by a rectifier 204 and provided to a series of lighting elements 206, 208 and 210 are provided in parallel to one another. While each of the first, second and third lighting elements 206, 208 and 210 are shown as a single diode, those skilled in the art understand that schematically that each lighting element shown comprises a plurality of series connected emitting diodes. Each lighting element 206, 208 or 210 can be the same or different wavelength and preferably a wavelength within 20 nm of a peak absorbance wavelength of a pigment of plant 30 that receives the light emitted. In one embodiment the first lighting element 206 is a first wavelength while the second and third lighting elements 208 and 210 are different wavelengths.

First, second and third impedance elements 212, 214 and 216 that preferable are transistors and more preferably are MOSFETs are arranged in the circuit 201 with resistors 217 and in bypass paths to provide the output shown in FIG. 9. In particular, as shown the first lighting elements 206 receive power and emit light for a first light interval 218 that is a first predetermined interval of time followed by a first dark interval 219 over a predetermined amount of time and a then a second light interval 220. Similarly the second lighting elements 208 provide a third light interval 222 that is a predetermined amount of time that is different than the predetermined amount of time of the first and second light intervals 218 and 220 followed by a second dark interval 223 and then a fourth light interval 224. Meanwhile the third lighting elements 210 present a third dark interval 225, a fifth light interval 226 and a fourth dark interval 227. In addition, a fifth dark interval 229 occurs preceding the first light interval 218 and a sixth dark interval occurs following the second light interval 220. Thus light and dark intervals can be manipulated to provide non synchronous or varying intervals of light and dark. In particular a phase cutting dimmer is utilized to control the fifth and sixth dark intervals 229 and 231 to vary time between pulses of light intervals to provide off or dark time proportional to turnover time of the photosynthetic electron transport chain to reduce photoinhibition rate. Similarly, the intervals alight and dark can be varied to shorten the periods of light proportional to transient properties of the plant to provide maximum intake of light with minimum power utilized.

Figure 10:
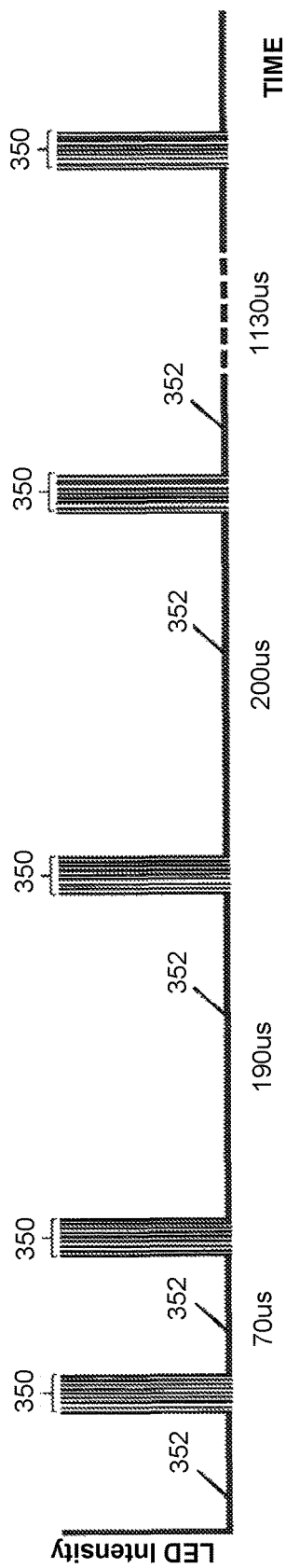
FIG. 10 is a graph showing light intensity over time of a lighting device for a horticultural system.

FIG. 10 shows a graphical representation light intensity provided by lighting elements in an alternative embodiment. In particular, during a first cycle the light is provided at four predetermined intervals of light 350 with predetermined periods of elongated darkness 352 therebetween proportional to the turnover time of the photosynthetic electron transport chain similar to the other embodiments of this invention. In one embodiment each predetermined interval of light 350 is approximately 20 μs and in another embodiment approximately 30 μs. In another embodiment each predetermined interval of light 350 within a cycle is an equal amount of time.

Similarly, the predetermined periods of elongated darkness 352 between the predetermined intervals of light 350 are longer in time than the predetermined intervals of light and in one embodiment predetermined periods of darkness 352 vary between in time between the predetermined intervals of light 350 within a cycle. In one embodiment and provided in FIG. 10 there are 70 μs between first and second predetermined intervals of light 190 μs between second and third predetermined intervals of light, 200 μs between third and fourth predetermined intervals of light and 1130 μs between the fourth predetermined interval of light and the first predetermined interval of light of a next cycle. Each predetermined interval of light 350 comprises light that is evenly pulsed during the predetermined interval of light 350 such that each predetermined interval of light 350 is made up of a series of pulsed light pulsing at an extremely fast frequency.

In one embodiment the predetermined interval of light 350 comprises a series of 1 μs pulses where individual lighting elements are constantly turned on and off during the entire predetermined interval of light 350. As a result, the light is simply not existent for a long enough period of time to be subject to transient properties of the plant, but still delivers the light intensity needed to result in the growth of the plant. In this manner energy is saved during the predetermined interval of light 350 as the lighting elements are only on for a portion of the predetermined interval of light 350, yet the plant still receives the dose of light needed to move forward with photosynthesis while losses of energy due to transient properties of the plant are minimized.

Figure 11:
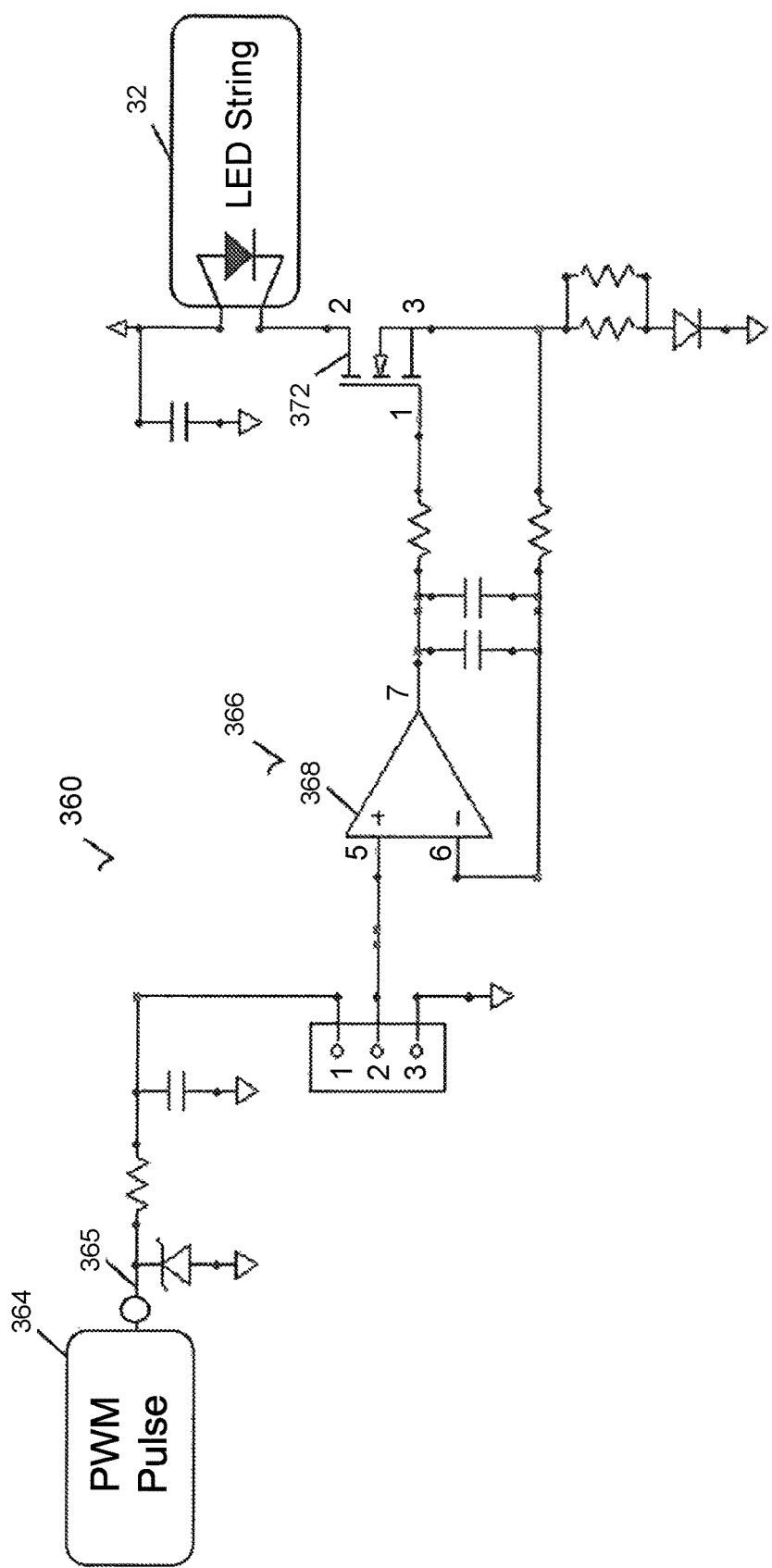
FIG. 11 is a schematic diagram of circuit for a lighting device for a horticultural and FIG. 12 is a graph showing the radiometric intensity of wavelengths of a lighting device for a horticultural system.

FIG. 11 shows one embodiment of circuitry 360 utilized to create the even pulses presented in FIG. 10 during the predetermined intervals of light 350. In this embodiment a PWM drive circuit 364 provides a DC input 365 that has a square wave voltage having predetermined periods of on time and off time to provide the predetermined intervals of light as is known in the LED lighting arts.

The predetermined periods of on time of the voltage is then modified by voltage conditioning circuitry 366 that includes an op amp 368 in combination with electronic components such as capacitors and diodes to filter voltage received by a switching device 372 that in this embodiment is a metal oxide semiconductor field effect transistor (MOSFET). The switching device 372 similarly is electrically connected to electronic components as provided in FIG. 11 to cause the switching device 372 to switch from on and off periods during the predetermined period of on time inputted by the PWM drive circuit 364 to supply voltage to a plurality of light emitting diodes 374 that are any of the lighting elements 32, 32a, 32b, 206, 208, 210 or the like without falling outside the scope of this disclosure. Thus, the predetermined intervals of light 350 are evenly pulsed accordingly.

While LED lighting elements 32 have been described along with an incubation chamber type structure, any type of light source that is able to deliver varying wavelengths of light or different photoperiods of light to any environment where artificial light is used to grow a plant is contemplated by this disclosure and such embodiments to not fall outside of this disclosure. This includes, hut is not limited to the use of a controller in association with incandescent, high pressure sodium, compact florescent, AC LEDs, DC LEDs or the like to illuminate a plant. This also includes, but is not limited in using a PWM driver with a controller that modulates the frequency of the driver to provide varying outputs that coincide with varying predetermined time periods associated with varying predetermined biological responses of the plant.

In particular, regarding the wavelength, or color of light, one determines the light wavelengths or colors for a plant that enhances a characteristic of the plant, such as growth, yield, root growth, or the like. Specifically, depending upon the chlorophyll or carotenoids within a specific plant, in addition to needing light at 680 nm or 700 nm at predetermined periods of time to minimize excess 680 nm and 700 nm light that can be used for ROS type reaction to harm a plant, light that is suited to be absorbed by the chlorophylls or carotenoids within a plant is provided to provide additional energy to the plant for chemical reactions that enhance photosynthesis. In this manner, light that is at a wavelength that is absorbed b the chlorophyll also enhances and promotes more efficient photosynthesis.

In operation, one can study and determine the predetermined light and dark period for a specific plant, along with predetermined light wavelengths or colors for a plant that enhance a characteristic of the plant, such as growth, yield or the like. In one embodiment this wavelength is 680 nm and in another embodiment 700 nm. Then lighting elements 32 are manufactured to present the predetermined light wavelength and the dimming device 34 can be adjusted to provide predetermined light and dark periods for enhanced growth.

Once the predetermined wavelength of the lighting elements are selected and the duration of times of light and dark are determined for each lighting element the manner in which the duration is accomplished is also selected. At this time the plant is again analyzed to determine if an additional pigment is presented within the plant. Thus, in the embodiment where chlorophyll A present, the plant is reanalyzed to determine if chlorophyll B is also present. If chlorophyll B is also present a second lighting element or plurality of lighting elements can then be selected. As with the first lighting element, the second lighting element is selected having a narrow band of wavelengths that relate to a peak 120, 125, 130, 135, 140, 145, 150, 155 or 160 of a pigment (chlorophyll A, chlorophyll B or carotenoid) within the plant.

Then, similar to the first selected lighting element, the duration of time for the dose or amount of light needed to complete the chemical reaction of photosynthesis is determined. As this point a method of providing the needed duration of light and dark, as described above is provided for the second lighting element. In this manner, both the first and second lighting elements provide the exact wavelength of light and duration of light and darkness as the pigments required within the plant, thus enhancing plant growth. This method can similarly be used related to the carotenoid pigment and other chemicals within the plant. In this manner multiple different wavelengths are utilized at different periods in a cycle to arrive at alighting treatment for enhancing photosynthesis.

Consequently, one analyzes the chemical reactions within a given plant and the needed wavelength of light to cause these reactions and the time during the photosynthetic process light is need to cause said reactions. Thus, light at the predetermined wavelength and the predetermined period is provided to cause the predetermined chemical reaction to achieve photosynthesis in the manner desired.

Once the chemical make-up of the plant is analyzed an algorithm is developed to determine what wavelengths of light are presented and for what predetermined periods of time the light is provided to a particular plant before a dark or non-reactive period for a particular lighting element is provided. For example, a first lighting element can be presented that presents 680 nm wavelength light at an intensity, or fluence and first period of time or duration that causes the P680 activation center to react and then a second period of time or duration for that specific lighting element is provided where light either is not presented or presented at an intensity or fluence that the output minimizes the auxiliary chemical reactions occurring while the chemical reaction or movement of the electron along the photosynthetic electron transport chain is moving forward. As a result the plant receives a dose of light during a given cycle wherein in one embodiment that dose is 400 $\mu mol \cdot cm^{-2} \cdot s^{-1}$.

Then after that second period of time or duration light at 680 nm wavelength is again provided at an intensity and third period of time or duration to cause an additional chemical reaction to occur furthering the reaction along the photosynthetic electron transport chain, then followed by a fourth period of time or duration where either no light is presented or the intensity minimizes the auxiliary chemical reaction, where the fourth period of time is determined by the length of time for the additional chemical reaction to occur along the photosynthetic electron transport chain.

While this fourth period can have the same length of the second period for ease of design purposes without falling outside of this disclosure, the periods also can present different lengths of time. Then this first light element providing the 680 nm can be controlled to provide additional periods of light and dark as previously described.

Simultaneously, a second lighting element that is adjacent to the first lighting element, whether in the same device or not is provided that is a different wavelength than the first lighting element. The second light element provides the second wavelength at an intensity and first period of time to provide an amount of light to enhance photosynthesis. This first period of time for the second lighting element can be during the first period of time for the first lighting element, overlap the first period of time or can be during the second period of time of the first lighting element when no light or limited intensity is presented. Thus, in one embodiment a first constant background light at a first lower intensity at a first wavelength, such as, for example only, 410 nm or 500 nm is provided for an extended period of time, such as, for example only at least 1 minute, alternatively, at least an hour or alternatively 24 hours. Simultaneously during this extended period of time the second light element provides another wavelength, such as, for example only, 680 nm that is pulsed, or light is provided on and off for predetermined periods of less than a second and in one embodiment varying times related to the time periods within the Kok cycle.

While in one embodiment the time between photon release may be presented as a dark period or time when a light source emits no photons, the time between periods when photons are ready to be accepted can also be filled with light emitted at intensities or wavelengths that are not absorbed by reactive components within the PSII or PSI complexes. For example only, P680 absorbs 680 nm wavelength light to result in the photochemical reactions desired; however, 450 nm blue or even wavelengths that are less than 450 nm and into the UV range 100 nm-400 nm could be utilized to cause other chemical reactions within a plant and not absorbed by the P680, such that such light does not cause the photo damage contemplated by this disclosure. Therefore a light source that provides a first wavelength that is absorbed and reacts the PSII complex provided intermediately or even simultaneously with a wavelength that is not absorbed and does not react the PSII complex resulting in the desired enhancement of photosynthesis without falling outside the scope of this disclosure.

Specifically, the plant is analyzed to determine the effect the second wavelength of light has on other reactive centers within the plant such as P680 and other chemicals present to again minimize harmful chemical reactions that cause the plant to use energy to protected or repair damage instead of for photosynthesis. In this manner, light at the second wavelength may be provided at an intensity or fluence and period of time that is harmful to the plant; however, the enhancement or improvement resulting in providing the energy to the plant makes the overall process more efficient and enhances photosynthesis.

Similarly, depending on the genetic or chemical make-up of the plant, additional lighting elements presenting additional wavelengths for additional periods of time that correspond to different desired chemical reactions are contemplated. For example only, a third lighting element providing light at a wavelength of 700 nm or 720 nm corresponding to the peak absorption level of the reactive center of PSI similarly is utilized. In particular, an individual plant is studied and different wavelengths of light provided at different time periods and intensities to minimize harmful chemical reactions within the plant and maximizing the performance of chemicals and chemical reactions to enhance photosynthesis through use of the lighting device.

Figure 12:
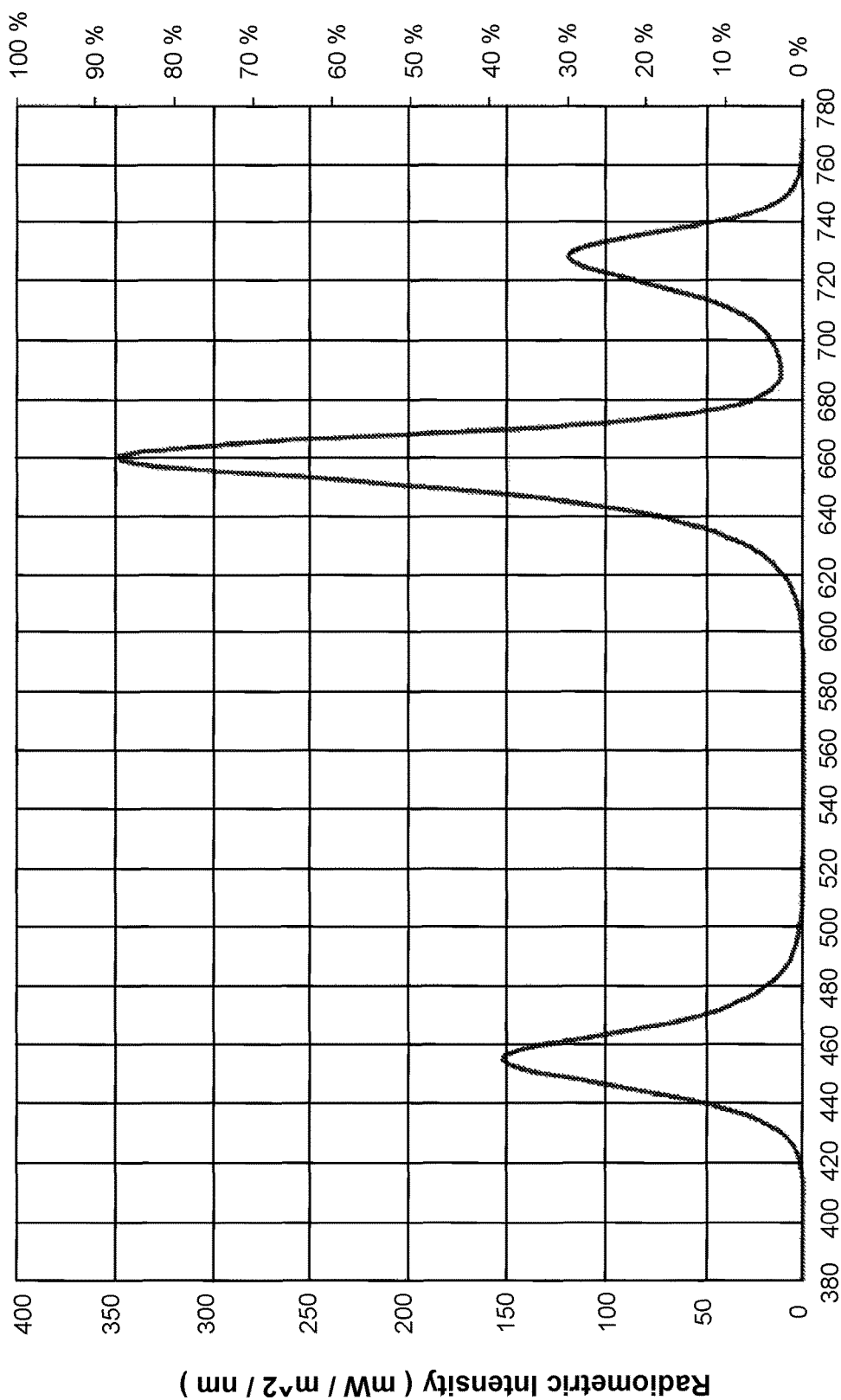

FIG. 12 shows the radiometric intensity (in mW/m^2/nm) of the spectral content of exemplary first and second lighting elements that can be achieved using exemplary circuity presented in this disclosure. Specifically the first lighting element emits a first light that is in narrow bands of red wavelengths and the second lighting element emits a second light that is in a narrow band of blue wavelengths. In one embodiment the first lighting element has a first light with a narrow band of wavelength that has a greater radiometric intensity than the second light of the second lighting element. In one embodiment the ratio of the radiometric intensity of the first light and the radiometric intensity of the second light is kept constant during a dimming process when the intensity of the first light and second light are reduced. Specifically, the radiometric intensity of the first light and second light are reduced to maintain the ratio of radiometric intensity of relative colors at a predetermined ratio. In one embodiment the ratio of radiometric intensity of a red wavelength band of color compared to the radiometric intensity of a blue wavelength band of color is four to one.

By maintaining a ratio of radiometric intensity of differing wavelengths of differing lighting elements the needed light or energy desired by the plant for differing functions is maintained to promote and enhance growth of the plant undergoing photosynthesis. In this manner to ensure correct fluence based on the position or location of lighting elements one need only adjust the intensity of the lighting elements Sc) a new lighting device is unneeded.

Thus provided are predetermined periods of light and dark that stimulate continuous growth of the plant. When used in the context of this application, predetermined periods of light and dark are measured or determined by what can be perceived by a plant 14 and represents periods when no light is being emitting by the lighting elements 32, even if the light or dark cannot be perceived by a human. Thus, flicker and unperceivable flicker present that is not perceived by humans is considered to provide a predetermined period of light and dark within the context of this disclosure. By using pulsing light with off time proportional to the turnover time of photosynthetic electron transport chain (PETC) reduces photoinhibition rate and increases photosynthetic efficiency.

In an experiment conducted by applicant three different light treatments were provided on tobacco. Three identical chambers were presented with the same soil, fertilizer, container for soil, temperature at set up, temperature maintained. Rh humidity at set up and Rh maintained and even approximate fluence, light wavelengths and energy were all kept constant, with the only difference being the period or the amount of time each wavelength of light was delivered to plant. Each chamber used deep red (approximately 650 nm-670 nm or 720 nm-740 nm), royal blue (approximately 440 nm-460 nm) and lime green (approximately 566 nm-569 nm). In the first chamber the deep red, royal blue and lime green each pulsed simultaneously in 4 pulse intervals with each pulse width being approximately 30 μs and after the first pulse approximately 85 μs of no light was provided before a second pulse of 30 μs. Then a period of approximately 230 μs of no light was provided before a third pulse of 30 μs. Then approximately 240 μs of no light was provided before a fourth pulse of 30 μs. Finally, a period of approximately 1360 μs of no light occurred before this cycle was restarted and maintained in this pattern for 24 hours until the plant was fully grown.

In the second chamber the deep red and royal blue outputs where identical to the first chamber with 4 pulse intervals occurring at the identical times as described in the previous paragraph. In the second chamber the lime green light source however did not pulse at the same intervals as the deep red and royal blue light sources. Instead the lime green light source pulsed once per cycle for 1200 µs, starting 80 µs after the end of the fourth 30 µs pulse (within the 1360 µs interval or period between the ending of a cycle of four pulses and beginning of a new cycle of four pulses) of the deep red and royal blue light sources and ending 80 us before the first 30 µs pulse of the next cycle of 4 pulses. This pattern was then maintained for 24 hours.

The final chamber was the control chamber that provided constant DC light of deep red, royal blue and lime green for 24 hours. There was 20% royal blue and 20% lime green compared to the deep red and the current was adjusted to ensure the exact same amount of light reached the control plants as in the first and second chambers.

In the experiment, measurements were taken showing greater growth in plant shoots in inches, lengths, wet weight, dray weight and root dry weight. The treatment in chamber 1 showed the greatest in all categories, followed by chamber 2. Chambers 1 and 2 had significant increases over the control in wet and dry weights with both chambers 1 and 2 showing 2-3 times more weight than the control. Thus, just by providing intervals of no light of 1360 µs and less based on the Kok cycle, the plant is able to grow 24 hours a day with significant weight gains compared to lighting that does not provide intervals.

In another experiment, using corn as a model plant, three proof of concept trials were conducted with initial findings that support the hypothesis that PETC synchronized pulsed light increases average photosynthetic efficiency and therefore increases growth rate of the plant.

Thus provided is a horticultural system that utilizes lighting elements 32 that are able to provide varying wavelength of light and varying periods of producing light to provide only functional light to a plant. Specifically, each photon is thus provided at the time required for a predetermined chemical reaction to take place and excess photons that are used in chemical reactions that damage the plant are minimized if not eliminated. By minimizing damage, growth is enhanced, causing faster growth and greener, better developed plant life.

Specifically by providing predetermined periods of light and dark that stimulate continuous growth of the plant to provide off time proportional to turnover time of photosynthetic electron transport chain (PETC) reduces photoinhibition rate and increases photosynthetic efficiency.

Therefore, not only can an algorithm be developed to determine when periodic periods of light and dark are required by a plant, along with what wavelength of light is required, light similarly can be provided in intervals to minimize transient properties of a plant.

By maximizing photosynthetic efficiencies, additional carbon and thus carbon dioxide requirements are provided. Thus, by increasing the CO2 available to a plant photosynthesis is further enhances maximizing the growth, color and nutrients of the plant. Thus a faster, healthier plant is provided improving on the state of the art.

Overall, different characteristics of a given plant can be enhanced. Thus, light treatments are provided that increase the weight and density of a plant, or can increase leaf size, increase or decrease root structure or manipulate a predetermined characteristic of the plant to provide a customized growth of the plant meeting the needs of the grower. This includes, but is not limited to increasing nutrients within the plant, faster growth of the part of the plant that is an end product for consumers and color or look of the plant.

Thus also presented is a method and assembly 10 for illuminating a plurality of plants 14, The assembly 10 includes lighting elements 32 that provide a lighting cycle or phase that includes a predetermined amount of dark or turnover time for the plant. As a result the plant 14 gets the needed rest to relieve plant stress and strain during the completion of the metabolizing process. At this point the plant 14 is then ready to absorb more light to continue metabolizing in the photosynthesis process.

Meanwhile, by selecting wavelengths of light based on the complexes and chemical reactions needed to cause photosynthesis the metabolizing and photosynthesis is maximized. Specifically LEDs can comprise the different networks 58 and 62 of LEDs to create intermittent UV, near UV, blue light and/or red light in light received by the plants 14 according to the ideal PAR for that particular plant 14. As a result, not only can you have a 24 hour constant light growing cycle, but in addition the growth of the plant in maximized. The result is faster maturation and larger yield for the plats.

In addition the assemblies 10 are easily manufactured and incorporated into new and existing horticulture assemblies by mounting or placing them otherwise adjacent to the plants 14. Finally, because current is conditioned from an AC input is utilized and pulse width modulation eliminated, the cost associated with the lighting element 32 is greatly reduced. Thus, at the very least all of the stated objects have been met.

The claimed invention is:

1. A horticultural system for growing a plant under artificial lighting comprising:
    a first lighting element positioned in spaced relation to the plant to emit a first light onto the plant;
    said first light comprising wavelengths that are within 20 nanometers (nm) of a peak absorption of a first pigment of the plant;
    a second lighting element positioned in spaced relation to a plant emit a second light onto the plant;
    said second light comprising wavelengths that are within 20 nm of a peak absorption of a second pigment of the plant; and
    a controller electrically coupled to said first lighting element and said second lighting element;
    wherein the controller operates the first lighting element and the second lighting element such that the first light and the second light from the first lighting element and the second lighting element are pulsed to provide non-synchronous predetermined intervals of light with an off time between pulses proportional to a turnover time of a photosynthetic electron transport chain of the plant;
    the predetermined intervals of light including a series of one-microsecond pulses where individual lighting elements are turned on and off during the entire predetermined interval of light;
    the off time between pulses proportional to the turnover time of a photosynthetic electron transport chain including a first off-time, a second off-time longer than the first off-time; a third off-time longer than the second off-time, and a fourth off-time longer than the third off-time;
    wherein the first light has a greater radiometric intensity than the second light; and wherein the radiometric intensity of the first light is proportional to the radiometric intensity of the second light.

2. The horticultural system of claim 1 wherein the wavelengths of the first light are between 655 nm and 740 nm and the wavelengths of the second light are between 425 nm and 465 nm.

3. The horticultural system of claim 2 wherein the predetermined intervals include: an on-pulse time for the first light for a first light duration of 2 seconds, and an on-pulse time for the second light for a second light duration of 3 milliseconds.

4. The horticultural system of claim 1 wherein the radiometric intensity of the first light is proportional to the radiometric intensity of the second light at a ratio of four to one.

5. The horticultural system of claim 1 wherein the ratio of radiometric intensity of the first light compared to the radiometric intensity of the second light remain constant as the first lighting element and second lighting element are dimmed.

6. The horticultural system of claim 1 wherein the first lighting element and the second lighting element are light emitting diodes.

7. The horticultural system of claim 1 wherein the first pigment of the plant is chlorophyll A and the second pigment of the plant is chlorophyll B.

8. The horticultural system of claim 1 wherein the first off-time is a 70 microsecond off time between a first predetermined interval of light and a second predetermined interval of light, and the second off-time is a 190 microsecond off time between the second predetermined interval of light and a third predetermined interval of light.

9. The horticultural system of claim 8 wherein the third off-time is a 200 microsecond off time between the third predetermined interval of light and a fourth predetermined interval of light, and the fourth off-time is a 1130 microsecond off time between a fourth predetermined interval of light and the first predetermined interval of light of a next cycle.

10. The horticultural system of claim 1 wherein the predetermined intervals of light are selected from a set of periods consisting of: 20 microseconds, and 30 microseconds.

11. The horticultural system of claim 1 wherein the first off-time is a 70 microsecond off time between a first predetermined interval of light and a second predetermined interval of light;

the second off-time is a 190 microsecond off time between the second predetermined interval of light and a third predetermined interval of light;

the third off-time is a 200 microsecond off time between the third predetermined interval of light and a fourth predetermined interval of light; and the fourth off-time is a 1.1-1.6 millisecond off time between a fourth predetermined interval of light and the first predetermined interval of light of a next cycle.

* * * * *